US006216064B1

(12) United States Patent
Johnson et al.

(10) Patent No.: US 6,216,064 B1
(45) Date of Patent: Apr. 10, 2001

(54) METHOD AND APPARATUS FOR DETERMINING ALTITUDE

(75) Inventors: Steven C. Johnson, Issaquah; Hans Rudolph Muller, deceased, late of Redmond, both of WA (US); by Beat Muller, personal representative, Marly (CH)

(73) Assignee: AlliedSignal Inc., Morristown, NJ (US)

( * ) Notice: Subject to any disclaimer, the term of this patent is extended or adjusted under 35 U.S.C. 154(b) by 0 days.

(21) Appl. No.: 09/255,670

(22) Filed: Feb. 23, 1999

Related U.S. Application Data
(60) Provisional application No. 60/097,392, filed on Aug. 21, 1998, and provisional application No. 60/075,809, filed on Feb. 24, 1998.

(51) Int. Cl.[7] .................. G06F 17/00; G06F 7/00
(52) U.S. Cl. .................. 701/4; 701/216; 701/214; 701/224; 342/462; 244/76 R
(58) Field of Search .................. 701/4, 1, 216, 701/213, 214, 224; 342/462; 244/76 R

(56) References Cited

U.S. PATENT DOCUMENTS

| | | | |
|---|---|---|---|
| 3,934,222 | * | 1/1976 | Bateman et al. .................. 340/970 |
| 4,431,994 | | 2/1984 | Gemin .................. 343/1 A |
| 4,797,829 | * | 1/1989 | Martorella et al. .................. 701/3 |
| 4,882,697 | * | 11/1989 | Ross .................. 701/221 |
| 5,079,711 | * | 1/1992 | Lambregts et al. .................. 701/3 |
| 5,210,540 | * | 5/1993 | Masumoto .................. 342/357.11 |
| 5,265,025 | * | 11/1993 | Hirata .................. 364/449 |
| 5,415,031 | * | 5/1995 | Colleu et al. .................. 73/178 R |
| 5,646,857 | * | 7/1997 | McBurney et al. .................. 701/213 |
| 5,745,868 | * | 4/1998 | Geier .................. 701/216 |
| 5,774,826 | * | 6/1998 | McBride .................. 701/207 |
| 5,828,987 | * | 10/1998 | Tano et al. .................. 702/150 |
| 5,952,959 | * | 9/1999 | Norris .................. 342/357 |

FOREIGN PATENT DOCUMENTS

| | | | |
|---|---|---|---|
| 2 293 452 | 9/1994 | (GB) | .................. G01C/5/00 |
| WO 97/05450 | 2/1997 | (WO) | .................. G01C/5/00 |

* cited by examiner

Primary Examiner—William A. Cuchlinski, Jr.
Assistant Examiner—Olga Hernandez

(57) ABSTRACT

Methods and apparatus for determining altitude, specifically altitude in an aircraft, and an estimated error of the altitude. The altitude determination preferably uses a first altitude based on hydrostatic calculations, including local pressure and temperature, as well as a second altitude which is preferably a GPS altitude. A radio altimetry can also be used instead of or to complement the GPS altitude. Other sources of altitude determination can be used in the equation for the calculation of the final altitude. Each of the sources of altitude determination is provided with a complementary estimated error. In the final determination of the probable altitude, each source of altitude information is preferably accorded a weighting according to the estimated error of the altitude source. For global positioning altitude, the final combination of the altitude sources uses a complementary filter which takes into account the selective availability of the GPS altitude. This accounts for the long-term accuracy but short-term inaccuracy of GPS altitude. Corrections are provided to account for horizontal changes in pressure gradient as the aircraft moves from an origin to a destination. The invention further provides for the altitude to be corrected based on non-standard atmospheric temperature (ISA) variations. The apparatus includes a computer processor and memory configured to receive the altitude information and make the necessary calculations to result in an estimate of the current altitude which is then displayed on an output display. The apparatus includes inputs to receive sources of altitude information.

74 Claims, 34 Drawing Sheets

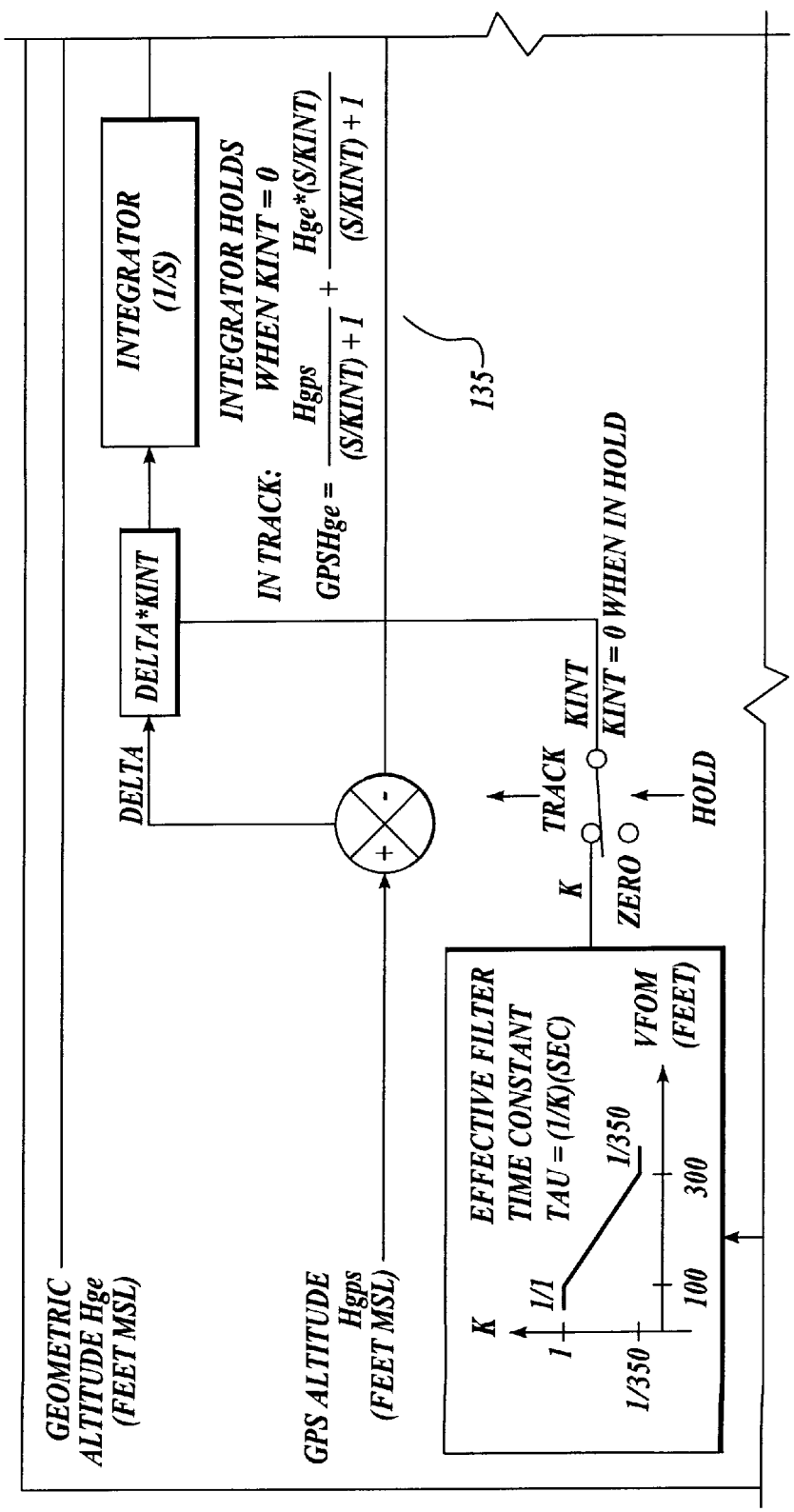

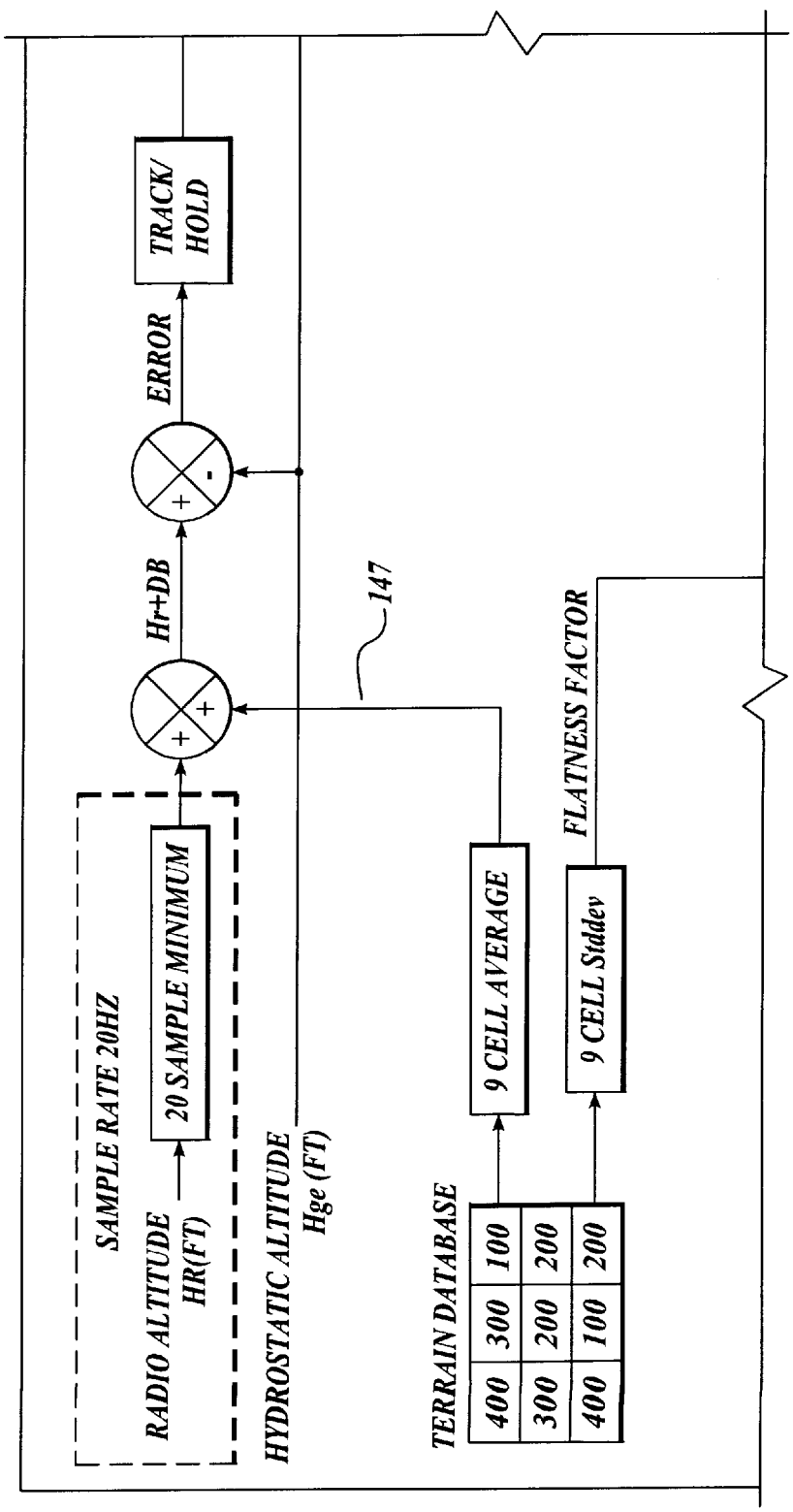

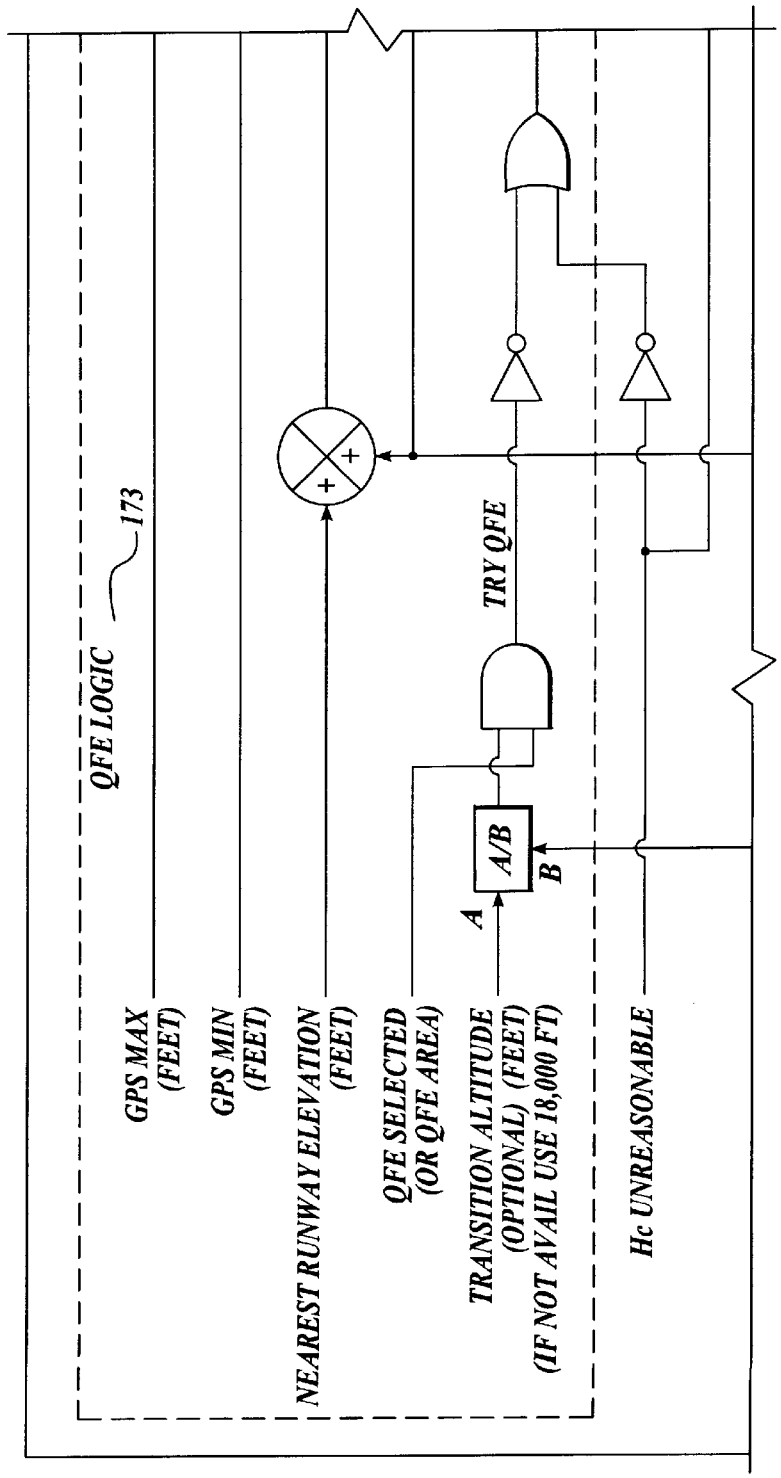

METHOD AND APPARATUS FOR DETERMINING ALTITUDE

PRIORITY APPLICATIONS

This application claims priority to U.S. Provisional Patent Application No. 60/097,392, titled "Device and Method for Improved Altimetry", filed Aug. 21, 1998 and to U.S. Provisional Patent Application No. 60/075,809 "Device and Method for Improved Altimetry", filed Feb. 24, 1998.

FIELD OF THE INVENTION

The invention relates to apparatus and methods of determining altitude, and in particular to apparatus and methods of providing an altitude value using existing sensors.

BACKGROUND OF THE INVENTION

Several applications depend upon accurate altimetry for performance. In aviation, aircraft separation, instrument flight paths and other navigation maintenance management functions are examples of such applications. This application discusses altimetry in the context of a specific application called ground proximity warnings, and more particularly, enhanced ground proximity warning systems (EGPWS). An EGPWS system is shown and described in U.S. Pat. No. 5,839,080 which is incorporated herein by reference.

Enhanced Ground Proximity Warning Systems require accurate geometric altitude referenced to mean sea level. To date, this input is provided by the aircraft's air data computer (ADC) in the form of Corrected Barometric Altitude. Barometric altimeters measure air pressure rather than geometric altitude. The conversion from pressure to altitude is based on an internationally agreed standard atmosphere (ISA). The ISA is most representative of average mid-latitude conditions. The ISA presumes that the atmosphere is static and dry, with air pressure dependent primarily on air temperature, gravity, and other physical constants. Atmospheric temperature is assumed to decrease at a constant rate up to 11 kilometers, the troposphere, at which point it is assumed to remain constant to 20 kilometers. Sea level temperature is assumed at 15 degrees C., and sea level pressure is assumed at 1013.25 millibars (mb). However, the real atmosphere can vary widely from this standard. This variation can cause errors in the indicated pressure altitude as compared with geometric altitude.

When we say "geometric altitude", we mean that altitude as defined by example in the treatise *Introduction to Flight, 3rd Edition*, (McGraw-Hill Series in Aeronautical and Aerospace Engineering, McGraw-Hill, November 1998) at page 70. in the example given in that treatise, if a helicopter hovering over Daytona Beach dropped a tape measure to the ground; "the measurement on the tape would be, by definition, the geometric altitude, i.e., the altitude above sea level." "Pressure altitude" is defined in the same treatise at page 79 as an altitude calculated using "the actual outside air pressure" (i.e., a local pressure measurement), as well as assumed (ISA) values for pressure at sea level, temperature at sea level, and temperature lapse rate (the assumed variation of temperature as a function of altitude). As discussed in the referenced treatise at pages 70 through 83, pressure altitude can be supplemented with correction factors for the actual pressure at sea level, the actual temperature at sea level, the local temperature, variations in the lapse rate from the assumed value, and variations in gravitational acceleration ("g"). Another expression for pressure altitude is "hydrostatic altitude", since the calculation is based on the known hydrostatic equation which calculates height of a column of gas as a function of the difference in the pressure of the gas between the top and bottom of the column. As used herein, "pressure altitude" shall mean altitude calculated using only a local pressure measurement and standard numbers, as well as that altitude and further including correction factors to account for variations from the standard (assumed) values. Unless specified otherwise, when the expression "altitude" is used herein, it is understood that we mean the estimation of geometric (or "true") altitude, using the described methods or apparatus.

The errors in the indicated pressure altitude mentioned above are typically not of concern at aircraft cruising altitudes since the primary use of the altimeter is to maintain separation between aircraft at different flight levels. Aircraft in the same general area experience the same atmospheric conditions, and therefore the same pressure altitude, within instrumentation limits. For instrument approach procedures, true geometric altitude is critical to maintaining safe terrain clearances. This is also the case for the EGPWS. Although the EGPWS design does make some allowance for altitude errors in its alerting envelopes, large errors in pressure altitude can cause the EGPWS to not give an alert when needed or alternately to give false warnings. Some atmospheric conditions which can lead to a non-ISA condition are listed below:

1. Sea level pressure non-ISA.
2. Temperature warmer or colder than ISA
3. Large vertical gusts due to, for example, extreme weather conditions, mountain waves, and other atmospheric phenomena.

Non-standard sea level pressure is normally accounted for by the pilot manually adjusting the aircraft's altimeter to the local pressure setting, i.e., corrected barometric altitude. Non ISA temperature errors can be quite significant. When the temperature is colder than ISA the indicated pressure altitude is higher than the true geometric altitude, when the temperature is warmer than ISA the indicated pressure altitude is lower than the true geometric altitude. Other temperature errors are caused by non-standard lapse rates due to inversions and other atmospheric conditions. Of particular concern are low level inversions which occur during the evening and in winter regions with snow cover.

Another source of error occurs when an aircraft travels horizontally across the earth's surface following a constant pressure surface. The use of corrected barometric altitude can introduce other errors as well. For example, since corrected barometric altitude relies on the pilot to enter the correct local pressure, this can also lead to errors. In another example, the use of QFE altitude settings, where the altimeter is adjusted to read zero on the runway, cause problems in the EGPWS.

SUMMARY OF THE INVENTION

A first aspect of the invention comprises a method for determining altitude by correcting a pressure altitude using information from a global positioning satellite system (GPS). In one embodiment of the invention, the information used from the global positioning satellite system comprises a GPS altitude. A second embodiment of the invention further comprises using a terrain data base and global positioning satellite system information in order to supplement a secondary source of altitude information, such as pressure altitude or GPS altitude, to determine height above terrain. In the second embodiment, the global positioning satellite system information comprises latitude and longitude of the position at which the altitude is being determined. The GPS latitude and longitude can be correlated to the terrain data base to determine the data to be selected from the data base. The data base includes terrain altitude information indexed by latitude and longitude on the earth's surface. The terrain altitude is subtracted from the secondary source of altitude information to determine the altitude above terrain, as opposed to the absolute (above sea level) altitude.

A second aspect of the invention comprises an apparatus for determining altitude. The apparatus comprises a processor configured to receive a GPS signal and a pressure signal, and calculate a pressure altitude based on the pressure signal. The processor is further configured to correct the pressure altitude with the GPS signal. The GPS signal can comprise a GPS altitude or a GPS latitude and longitude referenced to a terrain database which includes height above sea level of a point on the earth's surface indexed by latitude and longitude.

A method for determining the probable altitude, particularly of an aircraft, is also disclosed, as well as a method for determining the probable error in the altitude of an aircraft. The invention further includes an apparatus for performing the methods. The methods use as a base for altitude the pressure altitude which is based on an altitude reading at a known first location, such as a departure runway, and vertical changes in hydrostatic pressure using a hydrostatic pressure equation which is dependent on local pressure to calculate a corrected pressure altitude. A local temperature measurement can be used to further refine the corrected pressure altitude. The altitude based on the hydrostatic equation can be further supplemented with an altitude measurement from a secondary source, such as a global positioning unit or a radio altimeter. Preferably, the method uses a global positioning satellite (GPS) altitude to supplement the pressure altitude which is based on the hydrostatic equation. GPS altitude can be relatively inaccurate in the short-term because of intentional variation imparted to the altitude reading by governments. However, in the long-term, the GPS altitude is typically very stable. Contrariwise, in the short-term, the altitude based on the hydrostatic equation can be very accurate, but in the long-term it tends to build up errors because of long-term integration equation errors as well as horizontal travel across pressure gradients. The altitudes can be combined using a complementary filter which combines the long-term accuracy of GPS altitude with the short-term accuracy of altitude based on the hydrostatic equation. The complementary filter can be configured to filter out the long-term error of the hydrostatic equation as well as to reduce the short-term error of the GPS altitude. The complementary filter preferably uses a variable time constant to achieve optimized results. In one embodiment the time constant is based upon an estimated error in the GPS altitude at any given time.

For each altitude used to calculate the final altitude solution, an estimated altitude error is preferably calculated. These estimated altitude errors can be used to weight the final altitude solution. For example, if the altitude is composed of the average of an altitude based on the hydrostatic equation, a global positioning altitude, and a radio altimetry altitude, the estimated error for each of these altitudes is calculated based upon those factors which contribute to error in the particular altitude being considered. Altitudes having larger estimated current errors are discounted in the final solution and those altitudes having smaller errors are given greater weight in the final solution. Preferably, the algorithm for combining the various altitudes into a final altitude solution also includes a window or filter which we will call a "reasonableness check" which considers whether any given altitude at any given time is a reasonable estimate of the actual altitude. Those altitudes deemed to be unreasonable are not considered in the final altitude solution.

According to one aspect of the invention, the time constant used in the complementary filter to correct the GPS altitude is calculated from an optimized formula which considers the estimated errors in both GPS altitude and pressure altitude. In a second embodiment, the time constant is based only on an estimate of the error in GPS altitude.

FIG. 1 and FIGS. 2A through 2D show an overall block diagram 101 of an altitude correction method according to one aspect of the invention. The method makes use of additional sensors on the aircraft to arrive at an overall estimate of the true geometric altitude of the aircraft. The method can include the following six primary sources for altitude determination:

1. Pressure altitude calculation 103 from static pressure, and can include local temperature.
2. GPS altitude processing 105.
3. Calibration of pressure or other altitude with GPS altitude 107.
4. Calibration of pressure or other altitude with radio altitude 109.
5. Corrected barometric altitude processing 111.
6. Overall blending and reasonableness checking 113.

Other sources for altitude determination can also be included. The algorithm of the invention uses an accurate estimate of the errors of each of the inputs. The algorithm automatically detects large pressure altitude setting errors and includes logic for detecting and correcting QFE altitude setting, where the altimeter is adjusted to read zero on the runway.

BRIEF DESCRIPTION OF THE DRAWINGS

FIG. 5 shows a diagram which depicts the organization of FIGS. 6A through 6D, which collectively depict the block diagram of a calibration of pressure altitude with GPS altitude.

FIGS. 6A through 6D collectively depict the block diagram of a calibration of pressure altitude with GPS altitude.

FIG. 7 shows a diagram which depicts the organization of FIGS. 8A through 8F, which collectively depict the block diagram of a radio altitude calibration of pressure altitude.

FIGS. 8A through 8F collectively depict the block diagram of a radio altitude calibration of pressure altitude.

FIG. 9 shows a diagram which depicts the organization of FIGS. 10A through 10F, which collectively depict the block diagram for corrected barometric altitude.

FIGS. 10A through 10F collectively depict a block diagram for correcting barometric altitude.

DETAILED DESCRIPTION OF PREFERRED EMBODIMENT(S) OF THE INVENTION

Figure 1:
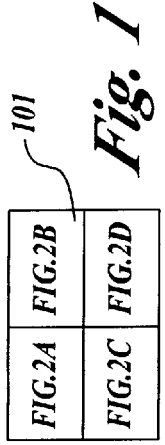
FIG. 1 shows a diagram which depicts the organization of FIGS. 2A through 2D, which collectively depict an overall block diagram of the altitude algorithm according to one aspect of the invention.
Figure 2A:
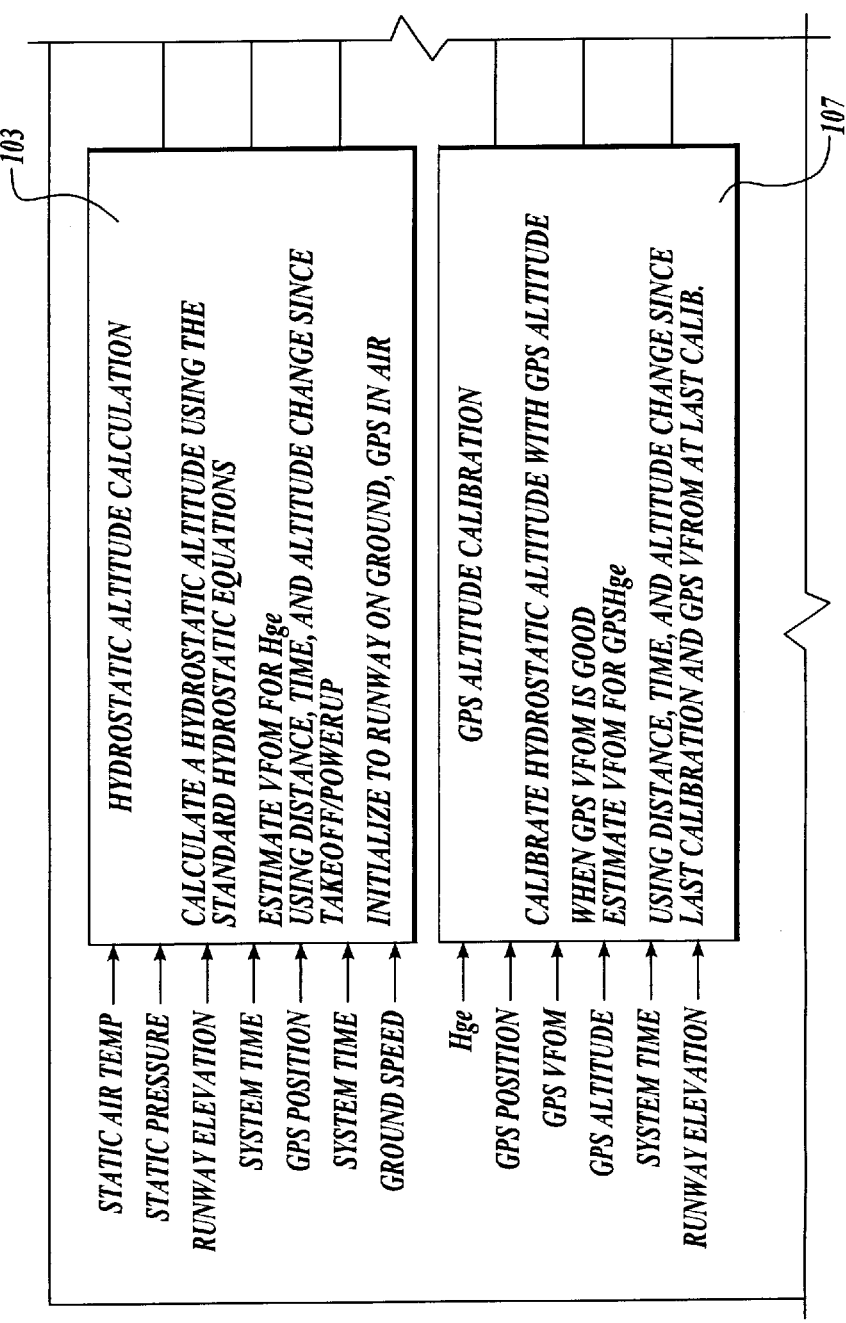
FIGS. 2A through 2D collectively depict an overall block diagram of the altitude algorithm according to one aspect of the invention.
Figure 2B:
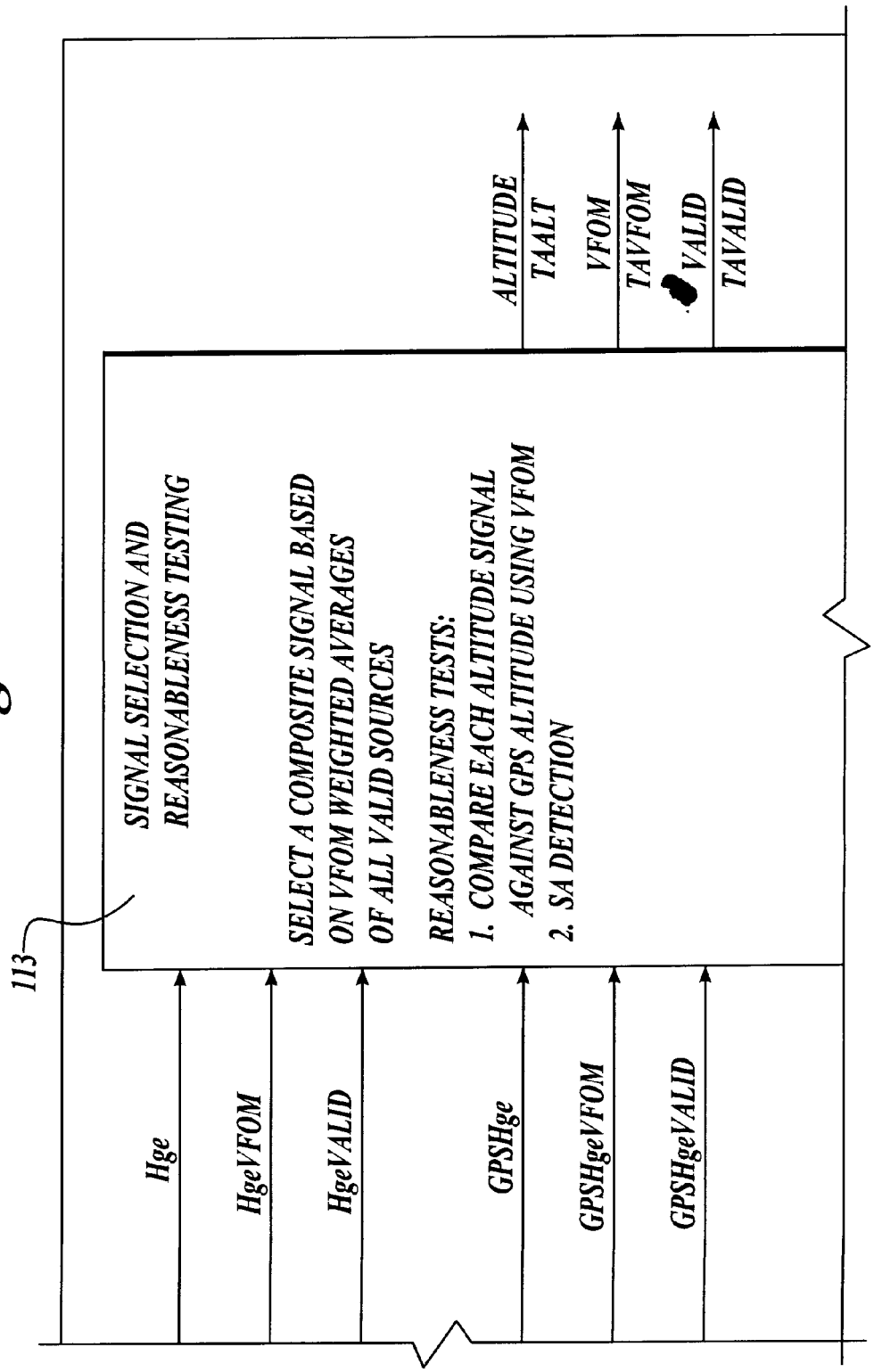
Figure 2C:
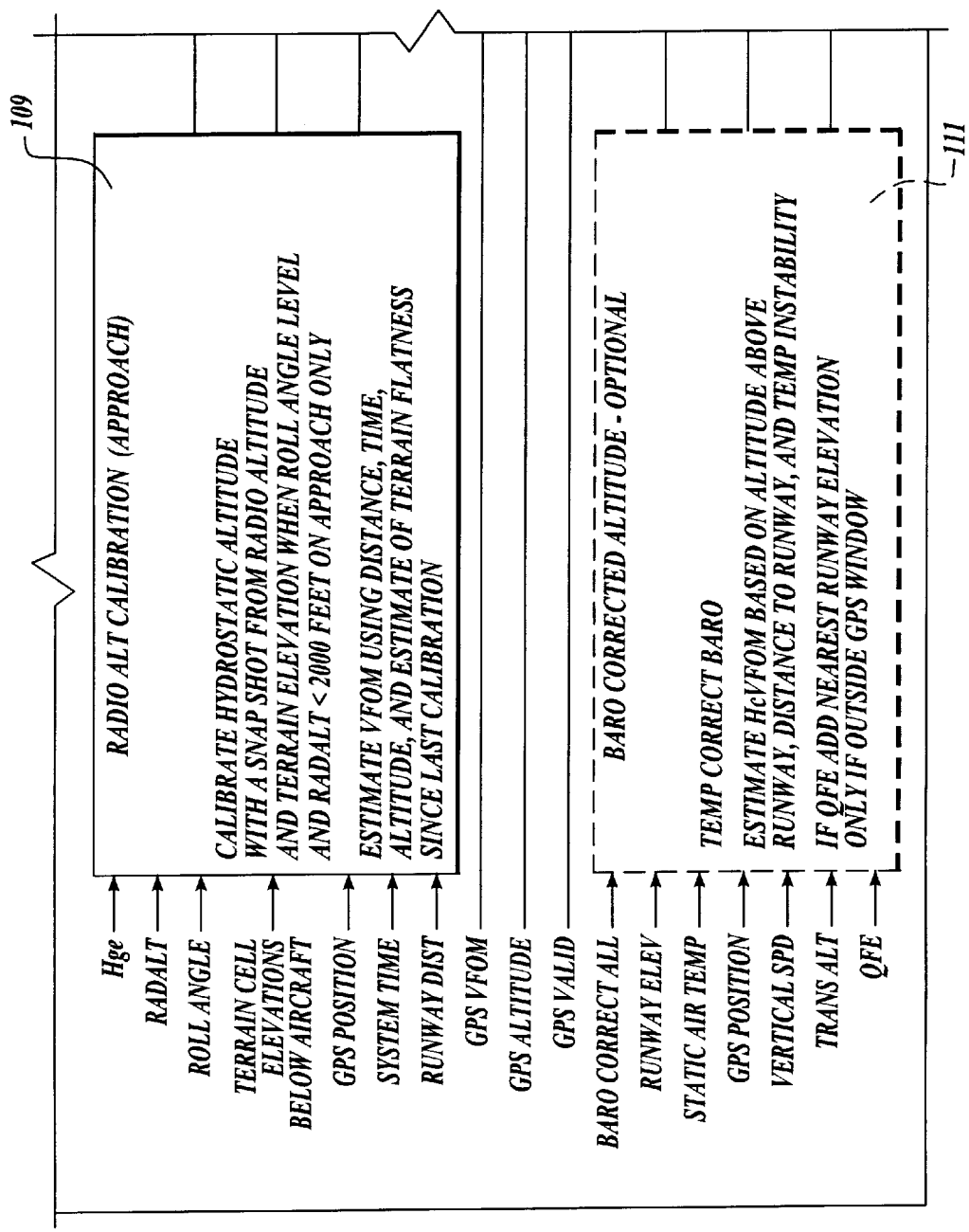
Figure 2D:
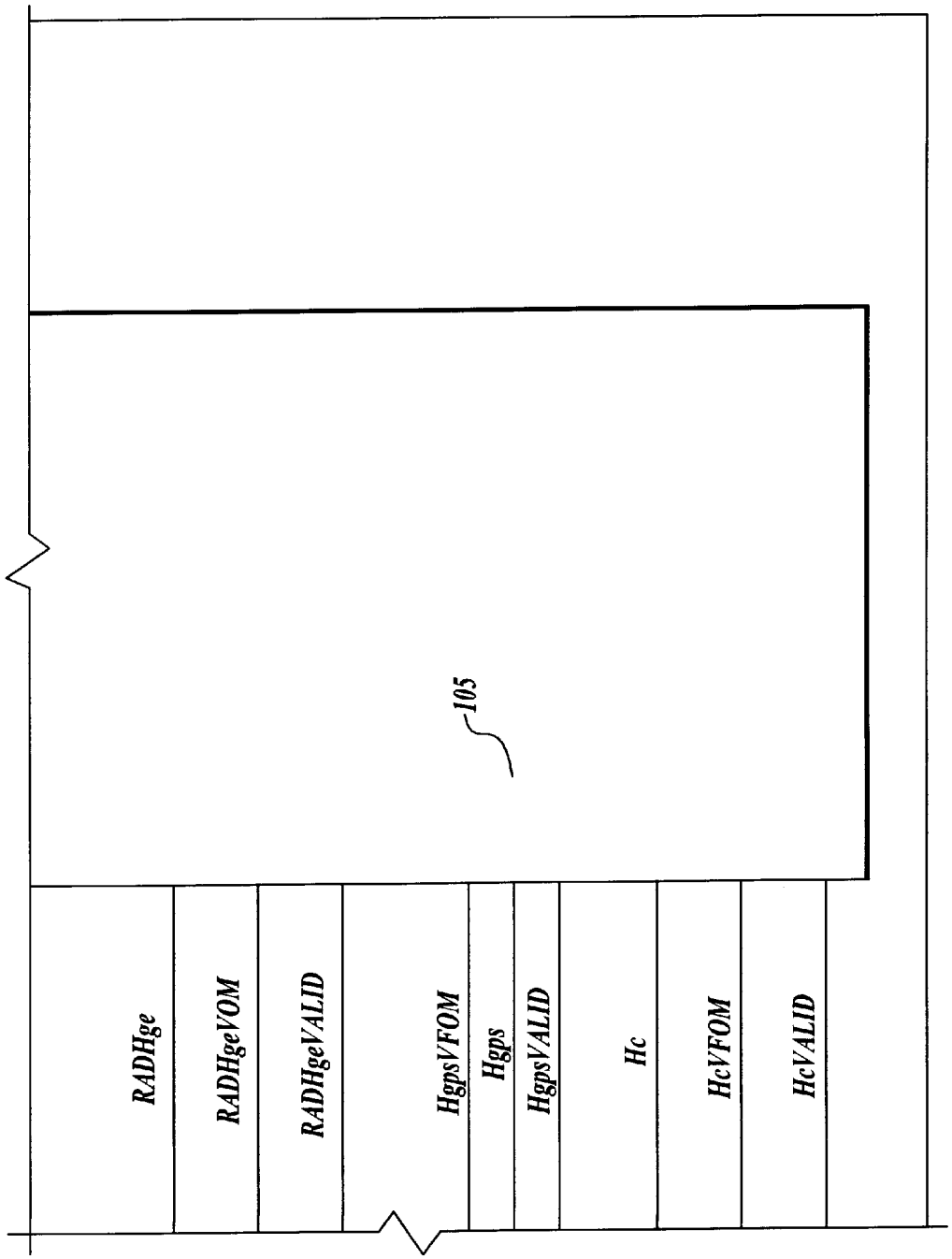
Figures 3, 4A:
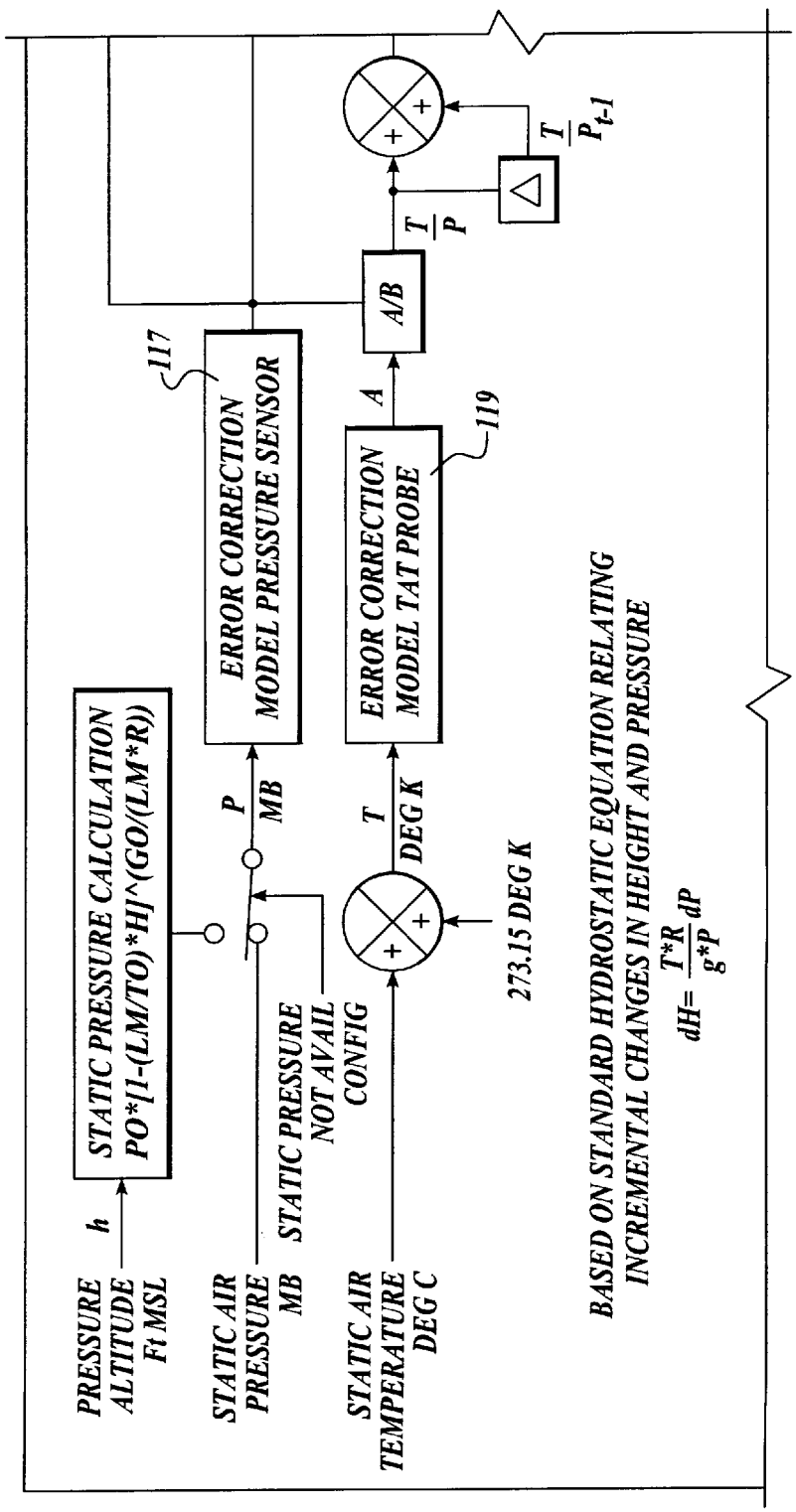
FIG. 3 shows a diagram which depicts the organization of FIGS. 4A through 4D, which collectively depict the block diagram of a pressure altitude computation.
FIGS. 4A through 4D collectively depict the block diagram of a pressure altitude computation.
Figure 4B:
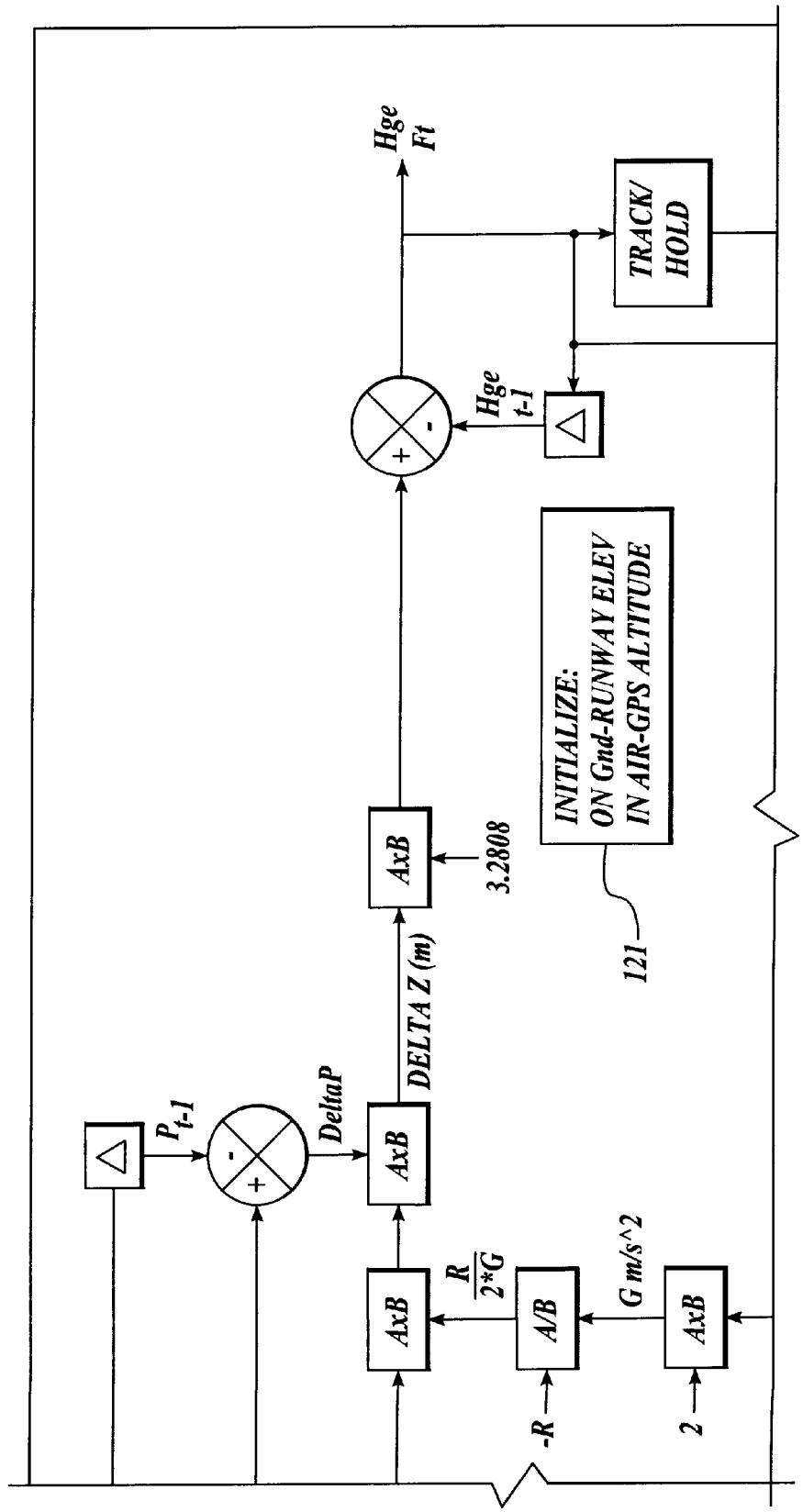
Figure 4C:
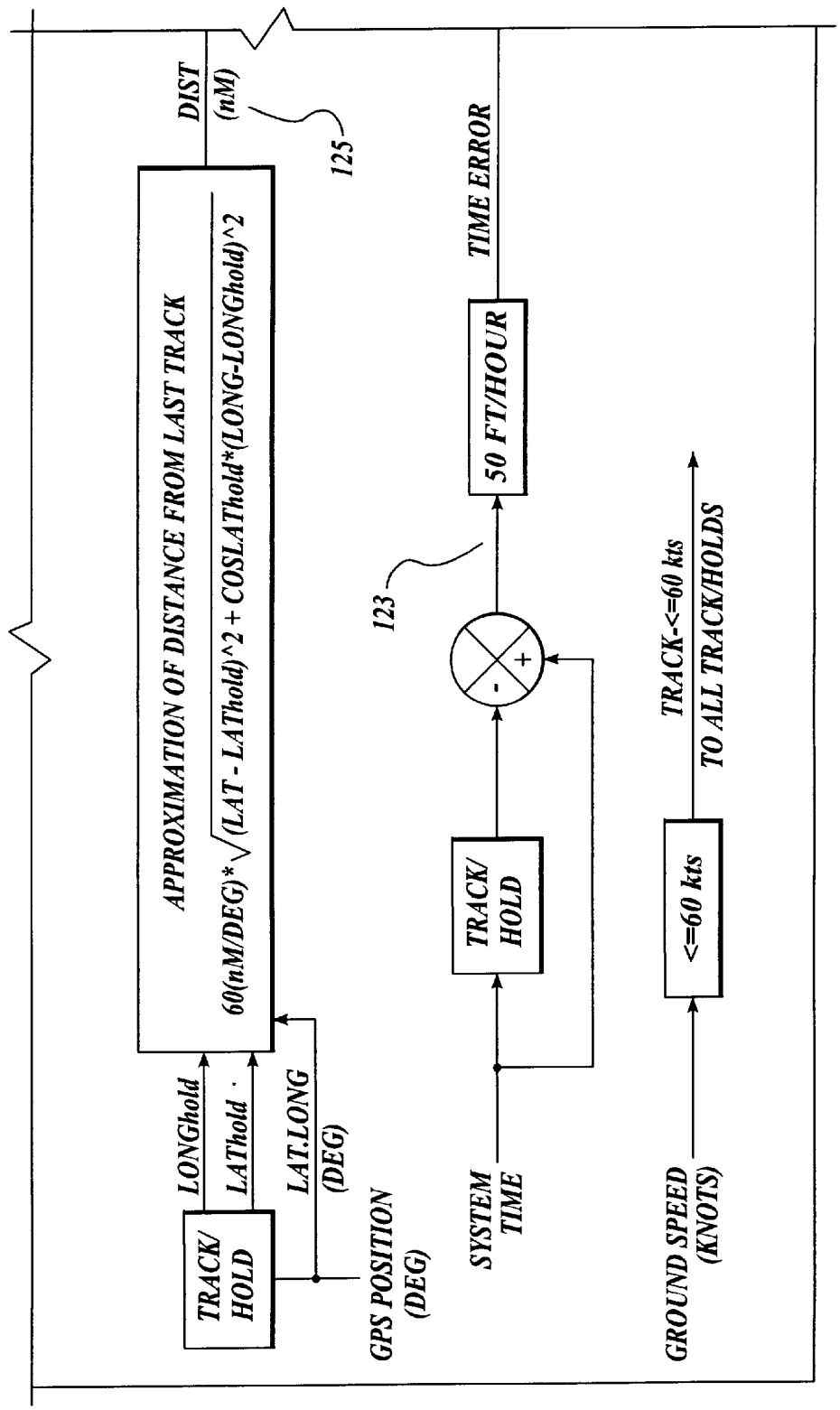
Figure 4D:
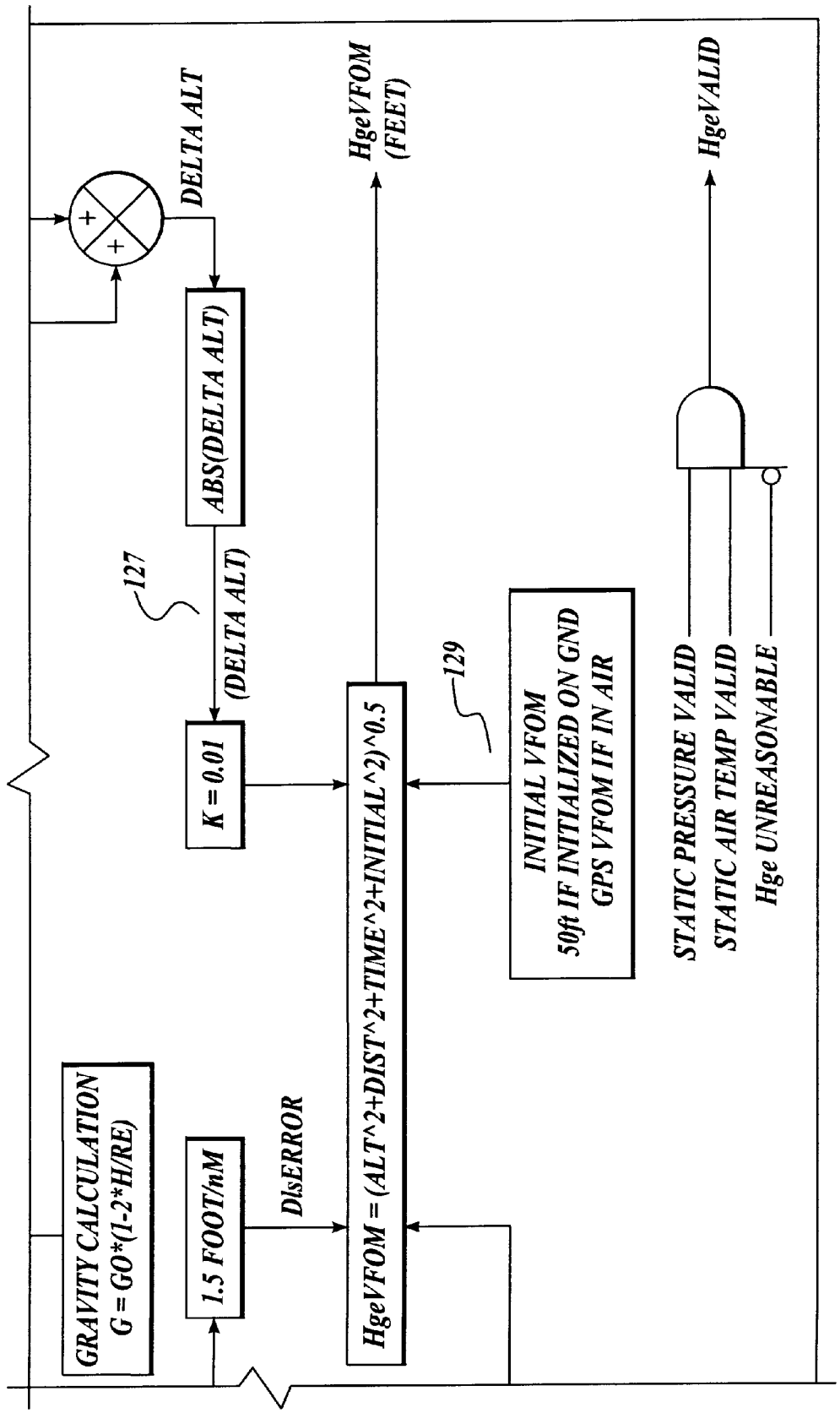
Figure 6B:
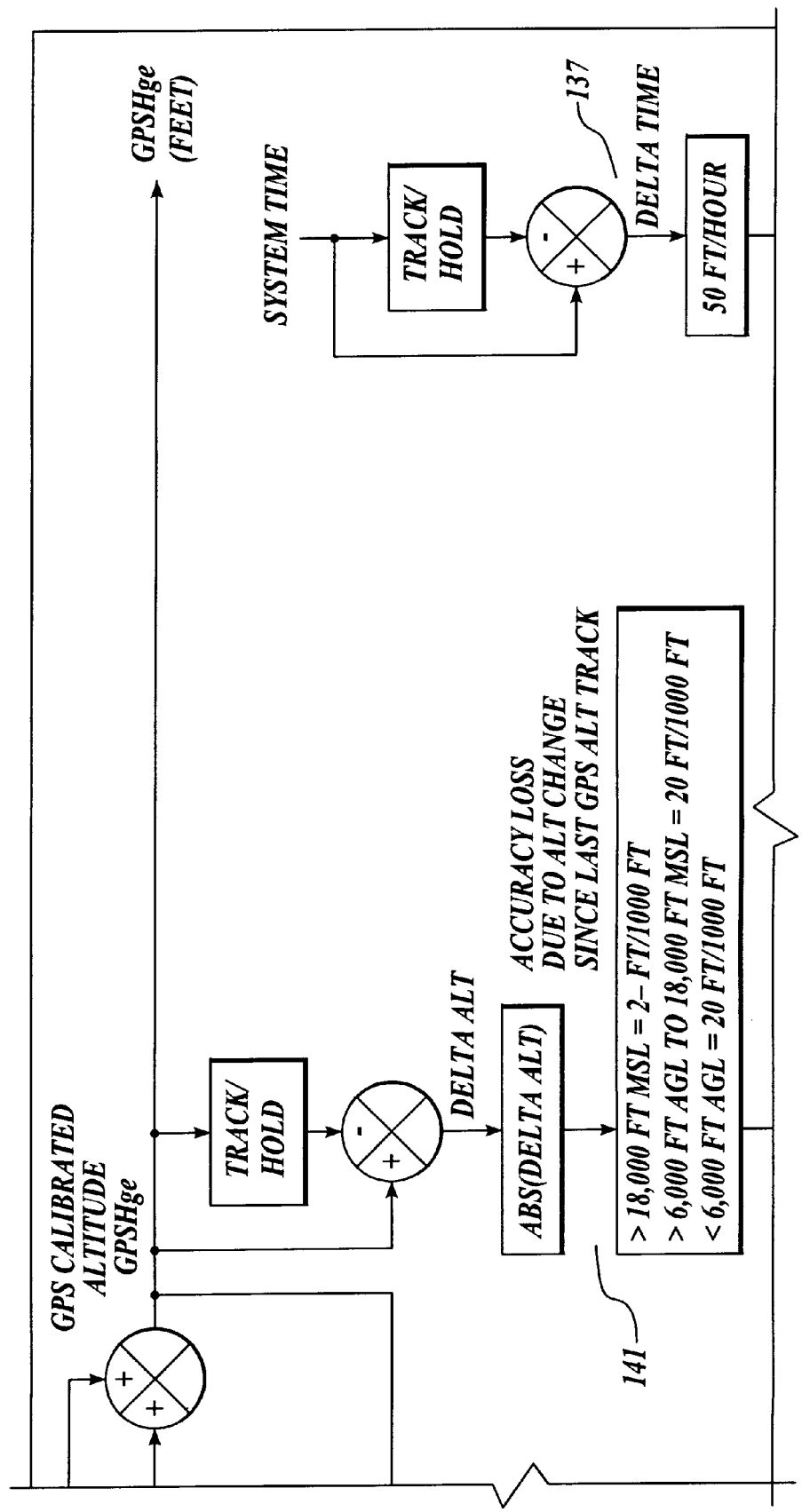
Figure 6C:
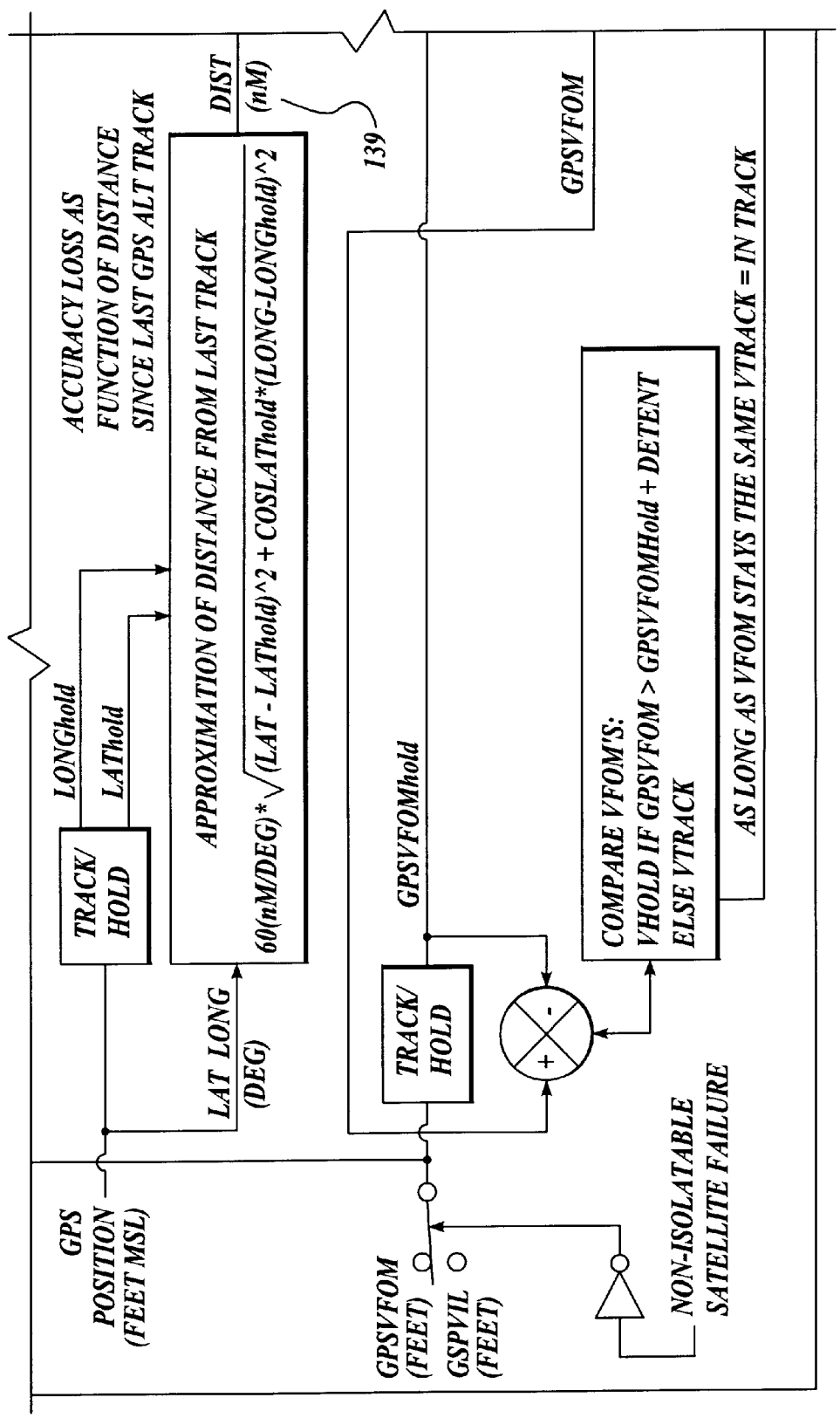
Figure 6D:
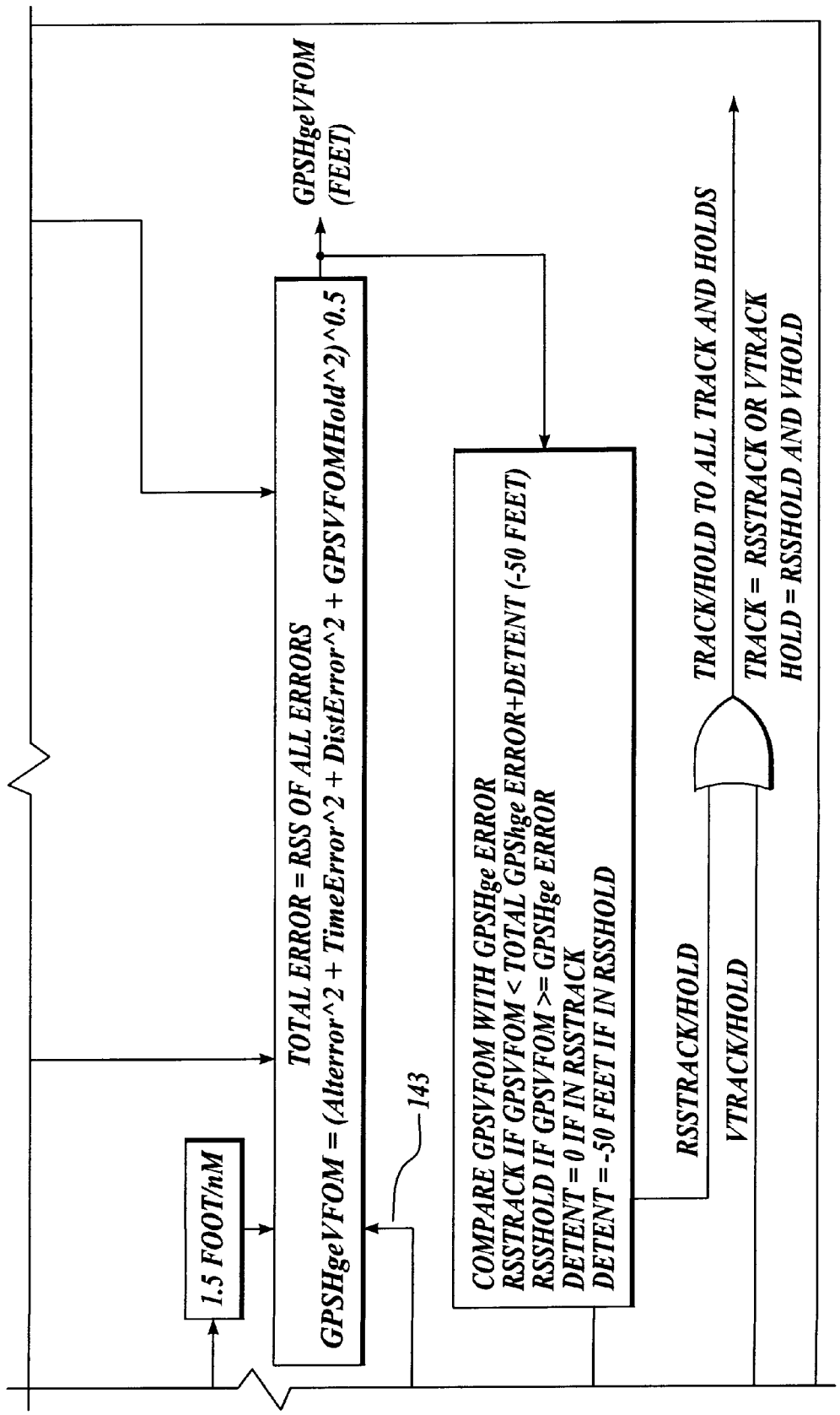
Figure 8B:
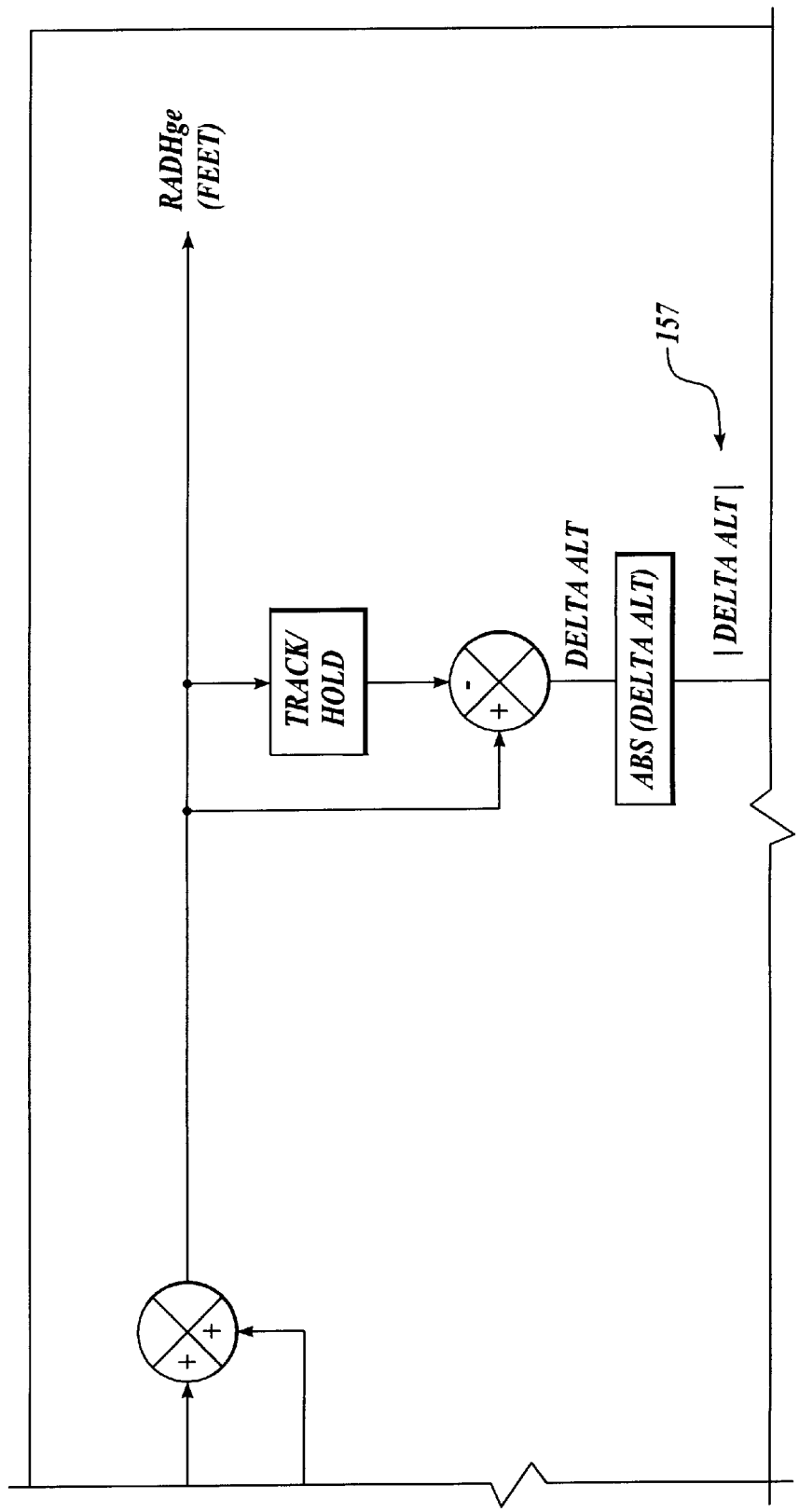
Figure 8C:
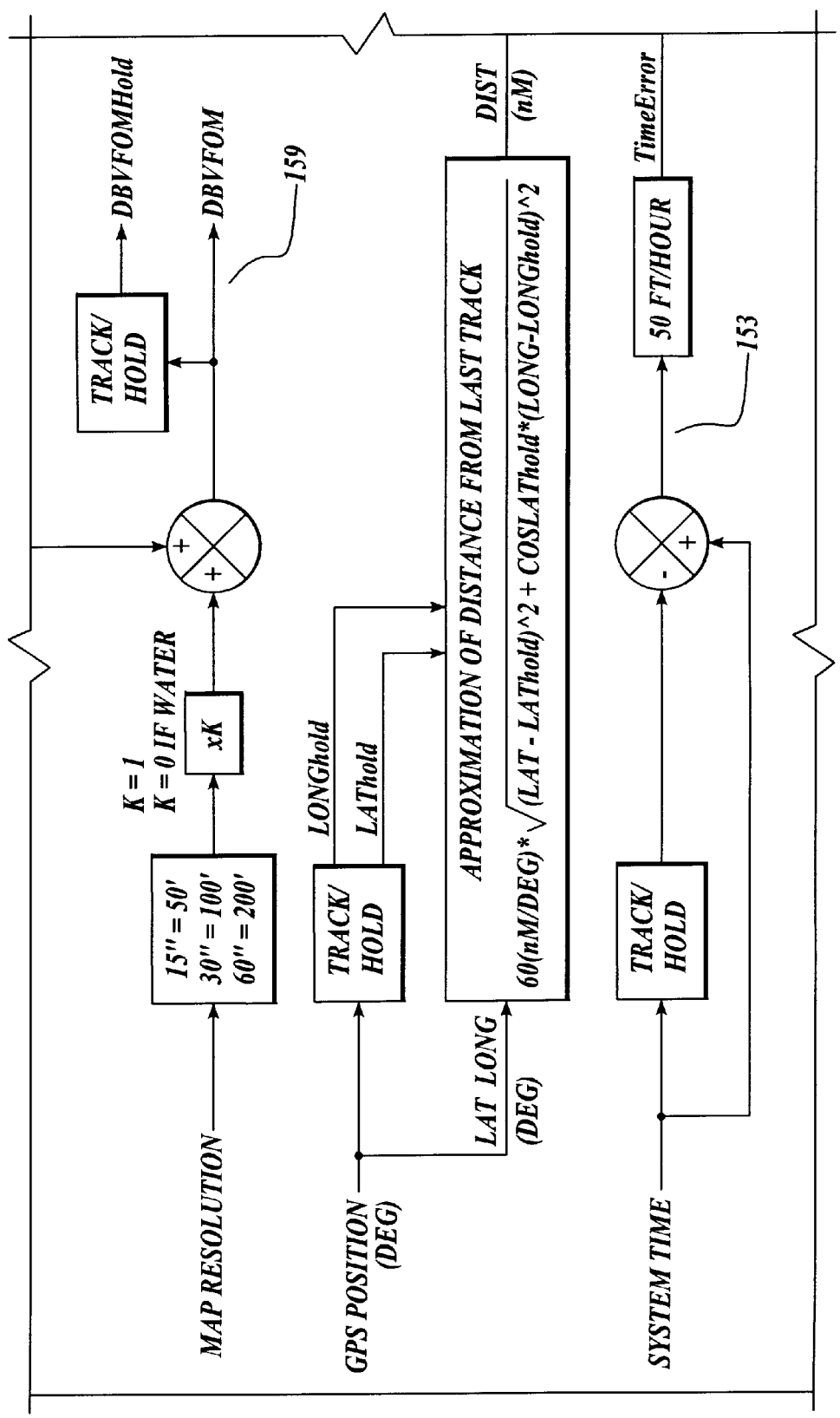
Figure 8D:
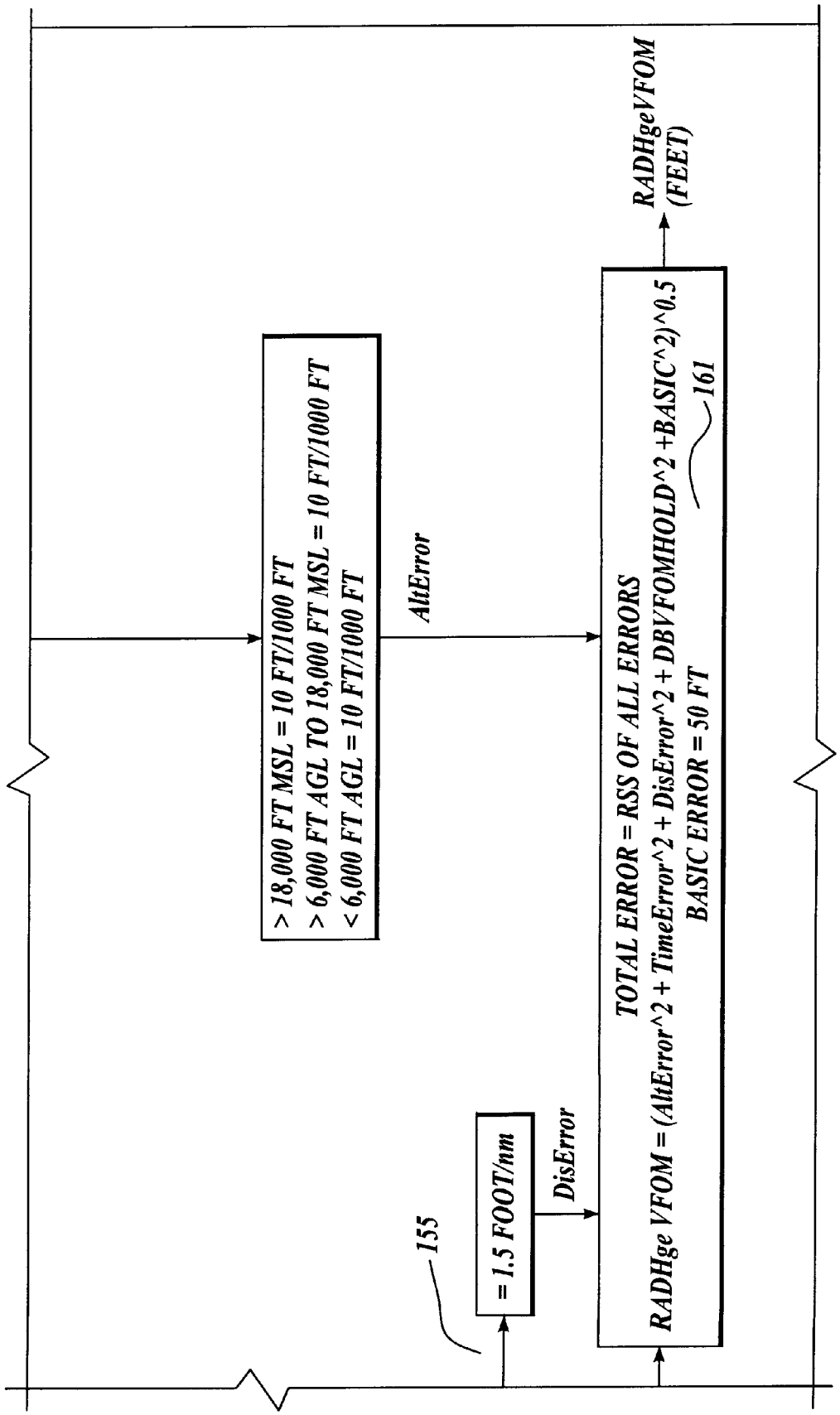
Figure 8E:
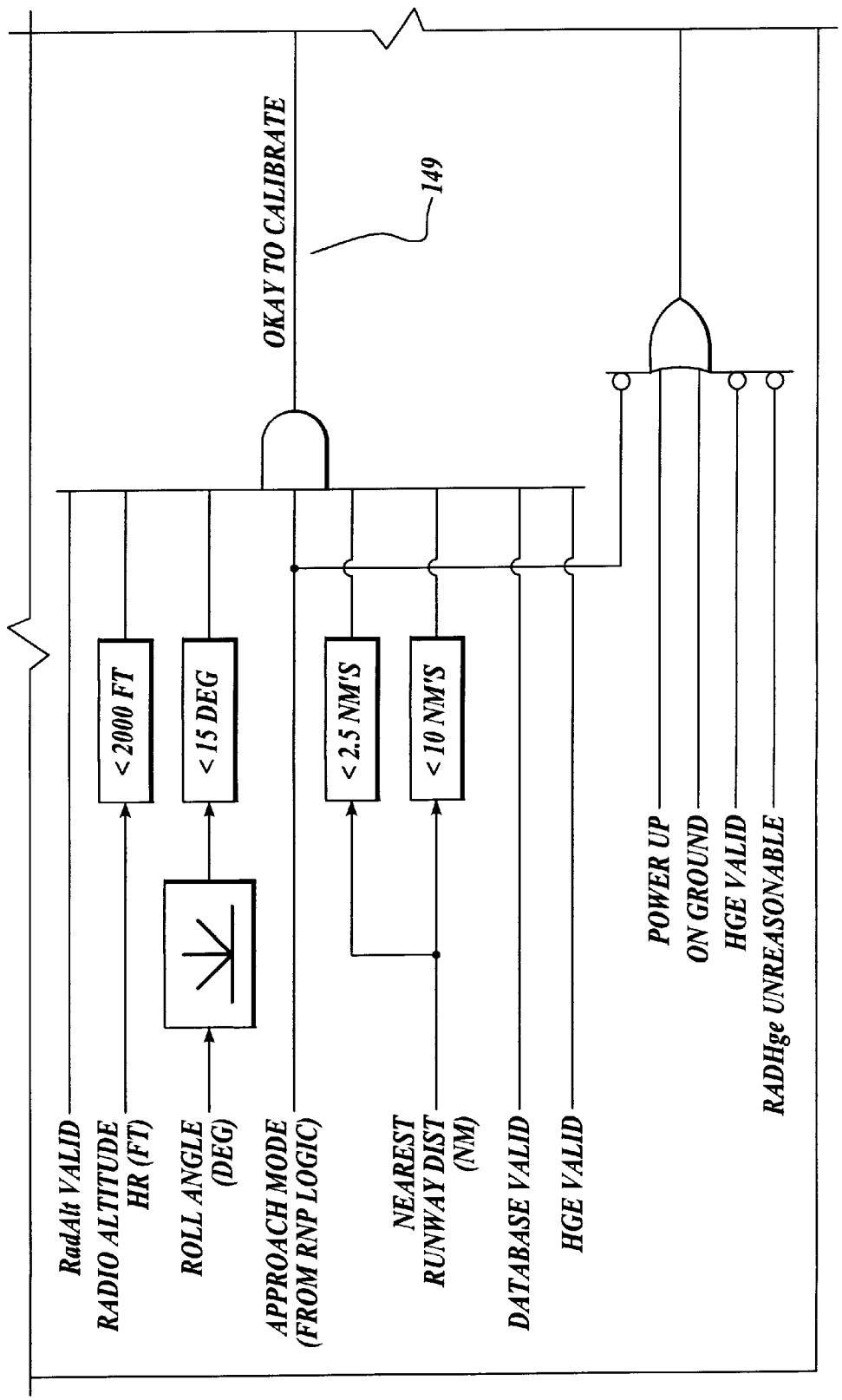
Figure 8F:
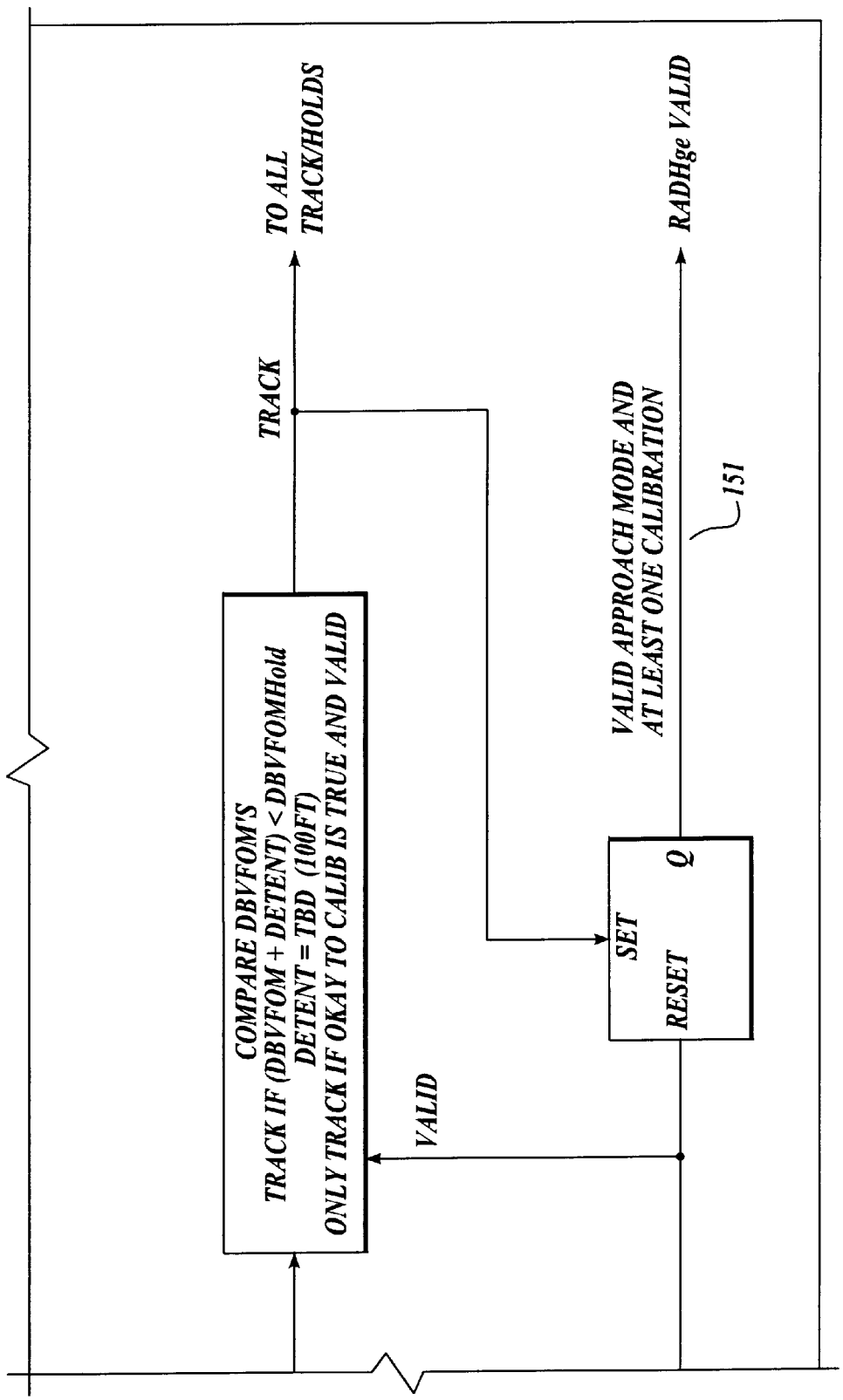
Figure 10B:
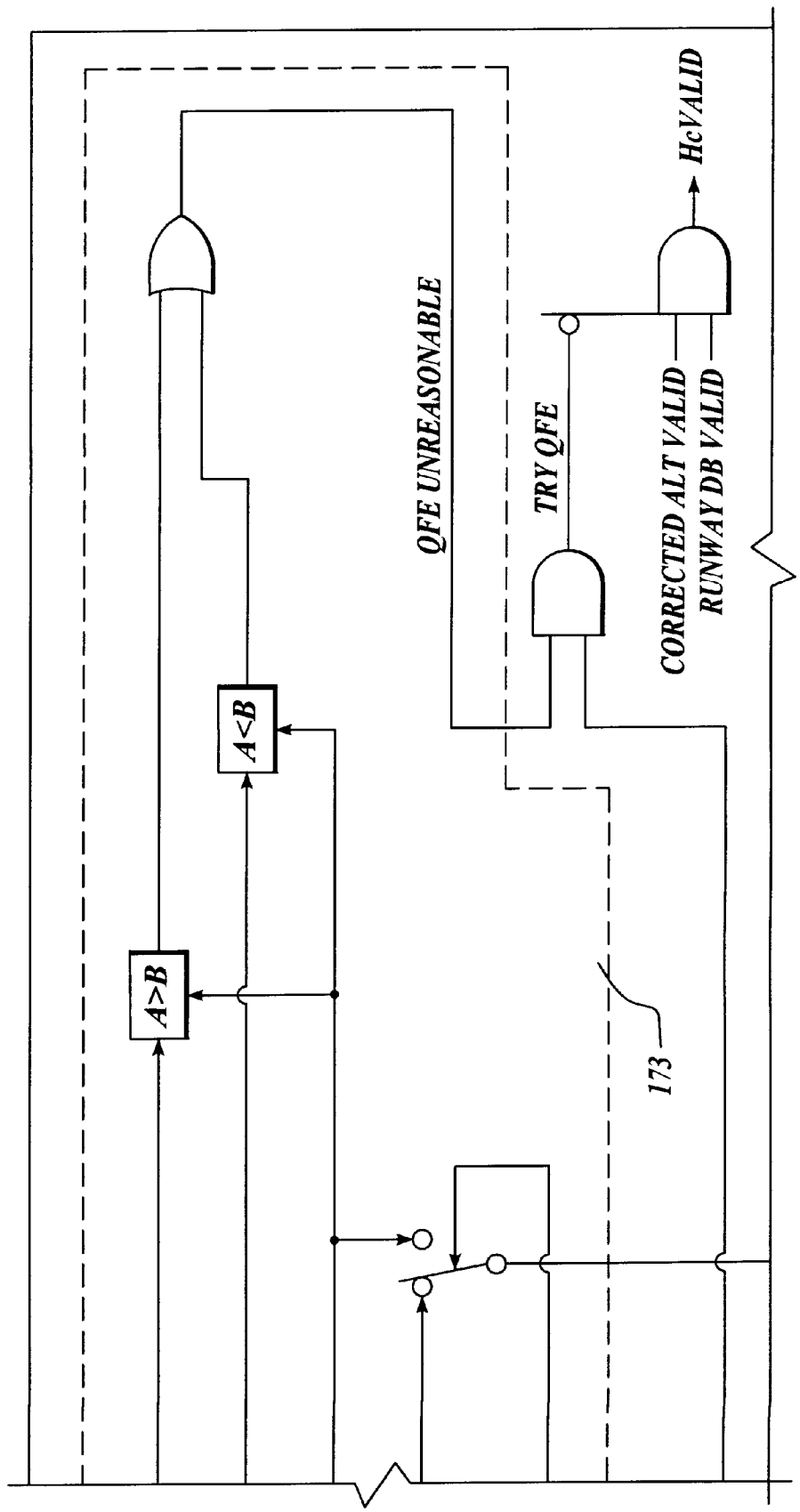
Figure 10C:
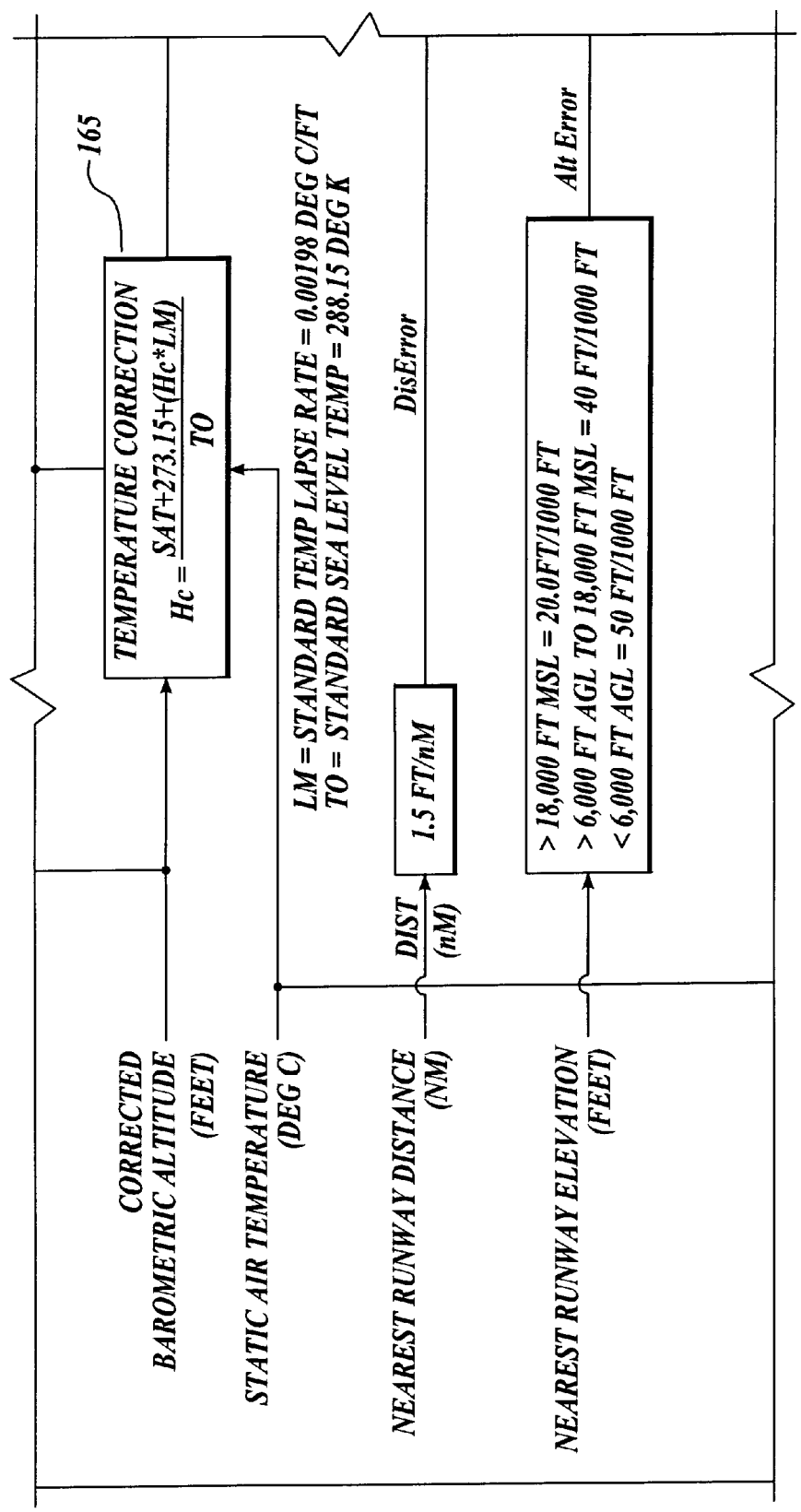
Figure 10D:
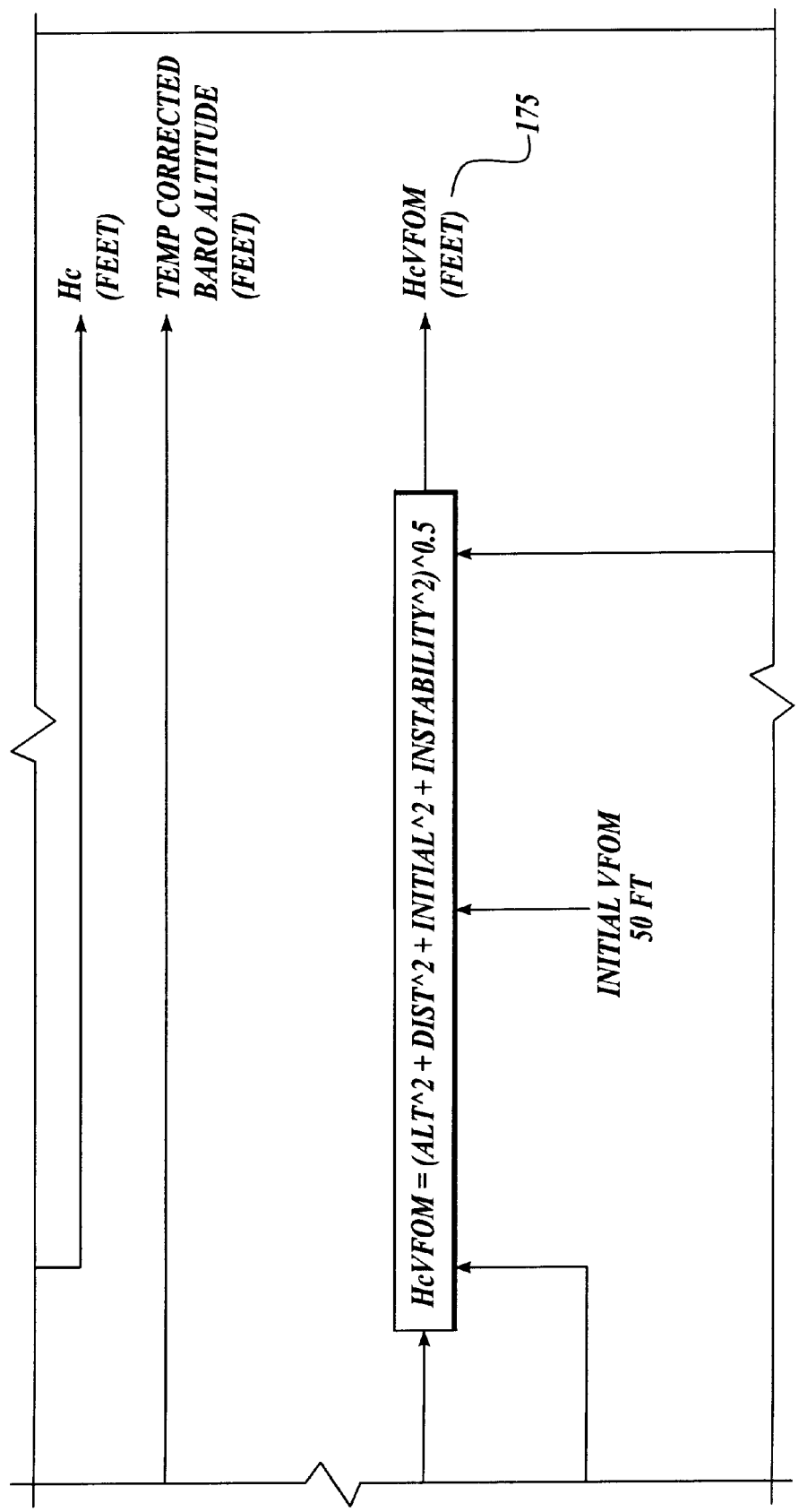
Figure 10E:
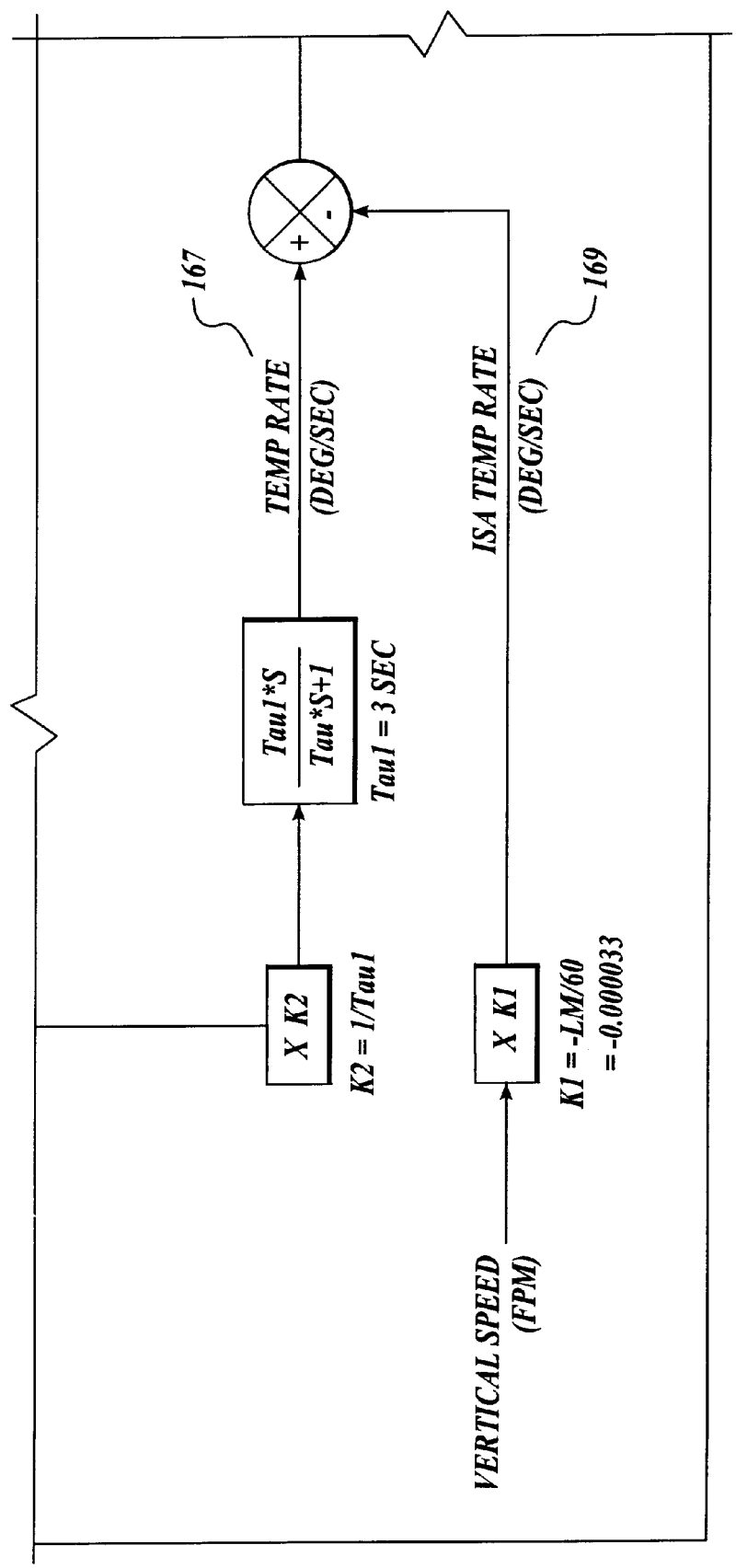
Figure 10F:
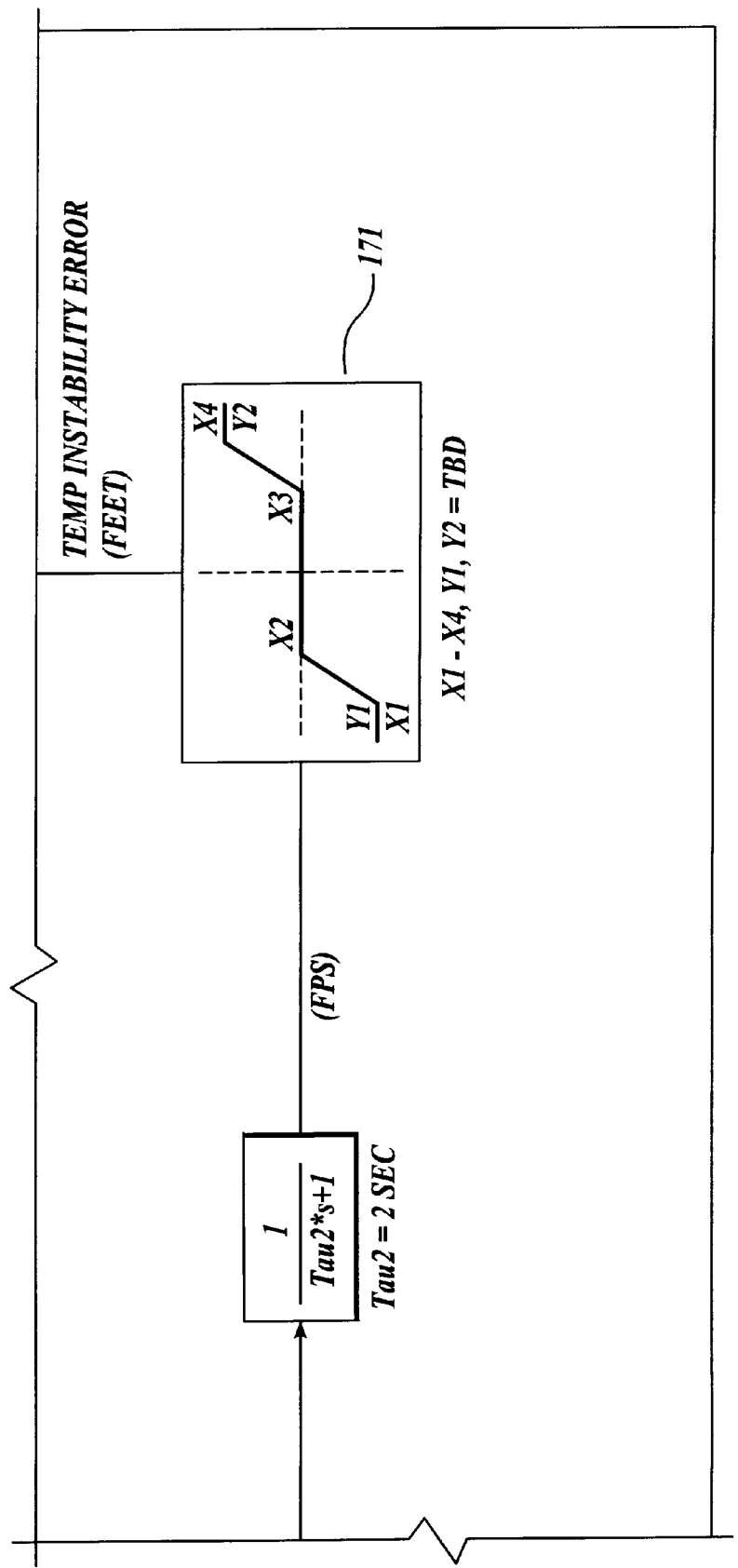

Methods and apparatus for determining an altitude and an estimated error in the altitude are disclosed. The method considers altitude calculated by various means and, for each altitude, an estimated error can also be calculated. The final altitude (estimated) is determined by considering the various altitudes determined by various means and the estimated error for each of the altitudes, and preferably discounts those altitudes having greater error, while giving greater weight to those altitudes having less estimated error.

In a preferred embodiment, the invention uses a first altitude calculated using a hydrostatic equation based on a first known altitude at a point of origin such as a departure runway, and local pressure at the point at which the altitude is desired to be known. The hydrostatic equation can be supplemented with a measurement of local temperature. A second altitude, which is preferably an altitude determined from a global positioning satellite (GPS) system, is used in combination with the first altitude. Alternately, a radio altitude can be used in place of the global positioning altitude. More preferably, the radio altitude is used in conjunction with the global positioning altitude.

The combination of hydrostatic altitude and global positioning altitude is preferable since hydrostatic altitude can be determined relatively accurately in the short-term, but degrades over the long-term due to cumulative integration errors in the solution, as well as horizontal travel across pressure gradients. Contrariwise, GPS altitude is relatively accurate over the long-term, but is somewhat inaccurate in the short-term. This is the result of an intentional dithering frequency or selective availability which is imparted to the GPS signal for government security reasons. In the preferred embodiment in which the hydrostatic altitude and the GPS altitude are used to determine the final altitude, the two components are combined using a complementary filter to filter out the long-term error of the hydrostatic equation and reduce the short-term error of the GPS altitude. The filter uses an algorithm which is preferably based on a time constant which is a function of the estimated error in the GPS altitude.

The time constant can be calculated based upon an optimization equation which considers the estimated error in the GPS altitude and an estimate of the dithering frequency of the selective availability introduced into the GPS signal. In addition, the optimized equation considers the estimated error in hydrostatic altitude. Alternately, the time constant (Tau) can be selected from a look-up table.

In the preferred embodiment, a plurality of sources of altitude are combined together to arrive at an optimized final altitude solution. More preferably, each of the altitudes which are used in the final calculation are provided with a corresponding estimated error. Before combining any given altitude into the final altitude solution, the altitude is more preferably checked against a filter or a window which considers whether the altitude is reasonable and should be used in the final calculation or is unreasonable and should not be used. Thereafter, the remaining altitudes are preferably weighted according to the inverse of the associated estimated error to arrive at a preferred solution. The estimated error for each altitude is based on the possible sources of error for that altitude which are likely to have a noticeable effect on the altitude.

Embodiments of the invention further comprise an apparatus for determining the probable altitude of an aircraft and the estimated error of that altitude. The apparatus is configured to receive signals from a variety of altitude-determining sources which can include GPS, pressure and temperature measurements for hydrostatic calculation, a radio altimeter, and a local broadcast altitude. The apparatus includes a processor, a computer-readable memory, and an output display. The computer-readable memory is configured to receive and store the various data associated with altitude and other sensory measurements used to calculate altitude and estimated error of the altitudes. The processor is further provided with a series of executable computer instructions for calculating the estimated errors and the corrected altitudes, and for combining the altitudes into a final altitude solution, as well as making a determination of which altitudes should be used in the final altitude calculation. Once a final altitude is calculated, the altitude and its corresponding estimated error are provided to a user through an output display which can comprise a digital display or a liquid crystal screen display, for example.

Preferably, the apparatus is configured to work in conjunction with the Enhanced Ground Proximity Warning System (EGPWS) to provide a pilot with information regarding intrusion of the ground into the flight path of the aircraft. In order to determine accurately whether the flight path may be intruded, it is important that the EGPWS be provided with an accurate estimate of the current geometric altitude of the aircraft.

Particular aspects of the invention will now be provided in detail.

Hydrostatic Altitude Determination

Pressure altitude calculated by the air data computer (ADC) can be significantly in error as compared to the true geometric altitude of the aircraft and is primarily caused by use of a standard atmospheric model and in particular to the assumption of a linear temperature lapse rate. The present invention provides an improved altitude calculation based on the hydrostatic equation which does not rely on these assumptions.

The hydrostatic altitude algorithm uses the standard hydrostatic equation of the atmosphere. Incremental changes in height dZ, and pressure dP are related as follows:

$$dZ = -\frac{T*R}{gP}dP \qquad \text{Eq. 1}$$

where:
P=atmospheric pressure
Z=geometric height
T=air temperature
g=acceleration due to gravity
R=universal gas constant Solving Eq. 1 by trapezoidal integration results in:

$$Zn = Zn1 - \frac{R}{2g}*\left(\frac{Tn}{Pn}+\frac{Tn1}{Pn1}\right)*(Pn-Pn1) \qquad \text{Eq. 2}$$

where:
n=current sample
n1=last sample.

The real-time computation of Eq. 2 forms the basic hydrostatic altitude algorithm.

Hydrostatic altitude must be initialized on startup. If the aircraft is on the ground, hydrostatic altitude is initialized to the current runway elevation. If power-up occurs in the air, hydrostatic altitude is initialized to GPS altitude. The basic hydrostatic equation is based on a vertical column of air and does not take into account errors due to the aircraft flying through pressure gradients. Given good pressure and temperature sensors, the pressure gradient error becomes the predominant error source. Before using the standard ADC equations, the pressure difference between the assumed standard atmosphere and the true atmosphere was the predominant error source.

Hydrostatic altitude is highly accurate for measuring relative vertical changes over short periods of time and distance, such as during take-off and approach. Hydrostatic altitude does not provide an absolute altitude and is prone to significant errors over extended periods of time and distance due to the effects of pressure gradients and long-term integration errors. Due to these limitations, hydrostatic altitude is not used directly, but is combined with additional signals such as GPS altitude before use in the final altitude solution. This is described in detail in later sections.

Gravity Calculation

Gravity is not a constant but varies as a function of altitude and latitude. This gravity variation is quite small and could be ignored, but the invention can also account for this variation using the equation:

$$g = g0*\left(1-\frac{2*Z}{RE}\right) \qquad \text{Eq. 3}$$

where:
g0=sea level acceleration due to gravity—9.80665 m/sec^2
Z=pressure altitude
RE=mean earth radius WGS-84=6,378,178 meters.

Estimating Errors—Hydrostatic Altitude

As stated above, the altitude algorithm depends on an accurate estimate of the current error. For the hydrostatic altitude calculation the error sources are:

1. Pressure sensor error 117.
2. Temperature sensor error 119.
3. Atmospheric errors
4. Computational errors
5. Initialization error 121.

Accurate pressure and temperature sensors provide overall accuracy. Current ARINC-qualified sensors used on most aircraft are believed to provide sufficient accuracy. The accuracy of pressure and temperature sensor errors are assumed by example as follows:

Pressure error=+/−0.6 millibars
Temperature error=+/−2.0 deg C.
Temperature and pressure time constants=1 second.

Note: these errors are twice the ARINC 706 ADC standard. Simulation shows that the sensor errors accumulated during climb tend to cancel during the subsequent descent. Atmospheric errors are composed of errors in the model of the atmosphere as well as pressure gradient errors.

Computational errors occur due to the long term integration required by the hydrostatic equation as a result of the integration rate and precision used in the computation. Floating point math is used keep the long-term integration errors to a minimum. Analysis has shown that the error due to the 1 second integration rate is small. These errors are covered by the conservatism in the overall error model. Initialization error is the expected error in the initial value given to the algorithm. On the ground this is runway elevation. This is within +/−50 feet. In the air, this is GPS altitude and the error is therefore GPS VFOM (vertical figure of merit). To cover the above errors, the estimated error (VFOM) is based on the following:

1. Time since initialization 123.
2. Distance traveled since initialization 125.
3. Altitude changes since initialization 127.
4. Estimated error at initialization 129.

Analysis of flight test data and analysis of weather data are used to set the above values. For example the initial values used are:

Time=50 feet per hour;
Distance=1.5 feet per nautical mile (nm);
Altitude changes=1.0% of altitude;
Initialization error=50 feet on ground, GPS VFOM in air.

Because the above errors are uncorrelated, the RSS method is used to arrive at the final VFOM as shown below:

$$VFOM = \sqrt{time^2 + dist^2 + alt^2 + initial^2} \qquad \text{Eq. 4}$$

As an example, consider a three hour flight in which the aircraft climbs to 36000 feet, then descends to a sea-level airport. Assume that the aircraft travels 750 nautical miles during this flight. The estimated accuracy of hydrostatic altitude upon arrival is given by:

$$VFOM = \sqrt{(50*3)^2 + (750*0.5)^2 + (36000*0.01)^2 + (50)^2}$$

VFOM=543 feet.

FIG. 3 and FIGS. 4A through 4D depict the block diagram of the hydrostatic altitude computation 131.

GPS Altitude Processing

With selective availability (SA) active, the current guaranteed accuracy of GPS altitude is 150 meters at 95%. Because of this error, GPS altitude alone has limited use.

The invention blends GPS altitude with other sensors to achieve the desired accuracy. The primary source of error in the GPS altitude is due to selective availability, which is the result of intentional dithering of the satellite clock. This dithering of the satellite clock appears as a slowly varying error with a period of around 5 minutes. The GPS altitude is output referenced to mean sea level for use by the EGPWS. The GPS receiver has a model of the WGS-84 geoid, where the WGS-84 is an approximation of the earth's surface defining a coordinate system which provides a reference surface for GPS and the geoid is the difference between the WGS-84 model and the true surface of the earth. Because GPS altitude provides a fairly accurate estimate of its current accuracy, the invention uses it as a reasonableness check on the other altitude calculations. Altitudes not within the window of GPS altitude +/−GPS VFOM are considered invalid, and not used for the final altitude solution. Receiver Autonomous Integrity Monitoring (RAIM) is a standard algorithm implemented in the GPS receiver for checking the integrity of the GPS signals. GPS altitude is not used if invalid or RAIM has detected a failure in which it can not continue. In addition, if the RAIM algorithm has detected a satellite failure but is unable to isolate it from the solution, the value of vertical integrity limit (VIL) is used in place of VFOM as the accuracy estimate.

Additional consideration is given to altitude aiding algorithms used in most modern GPS engines. Since the invention uses GPS altitude to calibrate pressure altitude as described later, care is used to determine that the GPS altitude is not already corrupted with pressure altitude errors. Most modern GPS engines use pressure altitude in the navigation solution, but it is significantly de-weighted in the final solution. This is at least the case when many satellites are available. As the number of satellites in the solution drop, the effect of pressure altitude on the final altitude solution increases. Therefore, the invention accounts for the number of satellites being used, and when available the status word indicating if altitude aiding is being used. If altitude aiding is being used the calibration is delayed until the number of satellites increases. GPS vertical figure of merit (VFOM) is used as the current estimate of the accuracy of the GPS altitude unless a non-isolatable satellite failure has occurred as described above in which case vertical integrity limit (VIL) is used.

Calibration of Hydrostatic Altitude with GPS Altitude

As described in the hydrostatic altitude section, hydrostatic altitude errors accumulate as a function of time, distance and altitude changes. Because of this accumulation of errors, it is desirable to re-calibrate hydrostatic altitude occasionally. Likewise, if another source of altitude estimation is used instead of, or complementary to, the pressure altitude, the source of errors in that source should be considered as well. GPS altitude can be used to do this. See FIG. 5 and FIGS. 6A through 6D for the block diagram 133. Re-calibration of hydrostatic altitude is accomplished with a complementary filter 135. Whenever the estimated GPS altitude accuracy is less than the current estimated geometric altitude accuracy the complementary filter is allowed to track. During tracking the transfer function is as follows:

$$GPSHge = \frac{Hgps}{Tau*S+1} + \frac{Tau*S*Hge}{Tau*S+1} \qquad \text{Eq. 5}$$

where:
   GPSHge=GPS calibrated hydrostatic altitude
   Hgps=GPS Altitude
   Hge=Hydrostatic Altitude
   Tau=Filter time constant which is discussed below
   S=Laplace operator.

Figure 12:
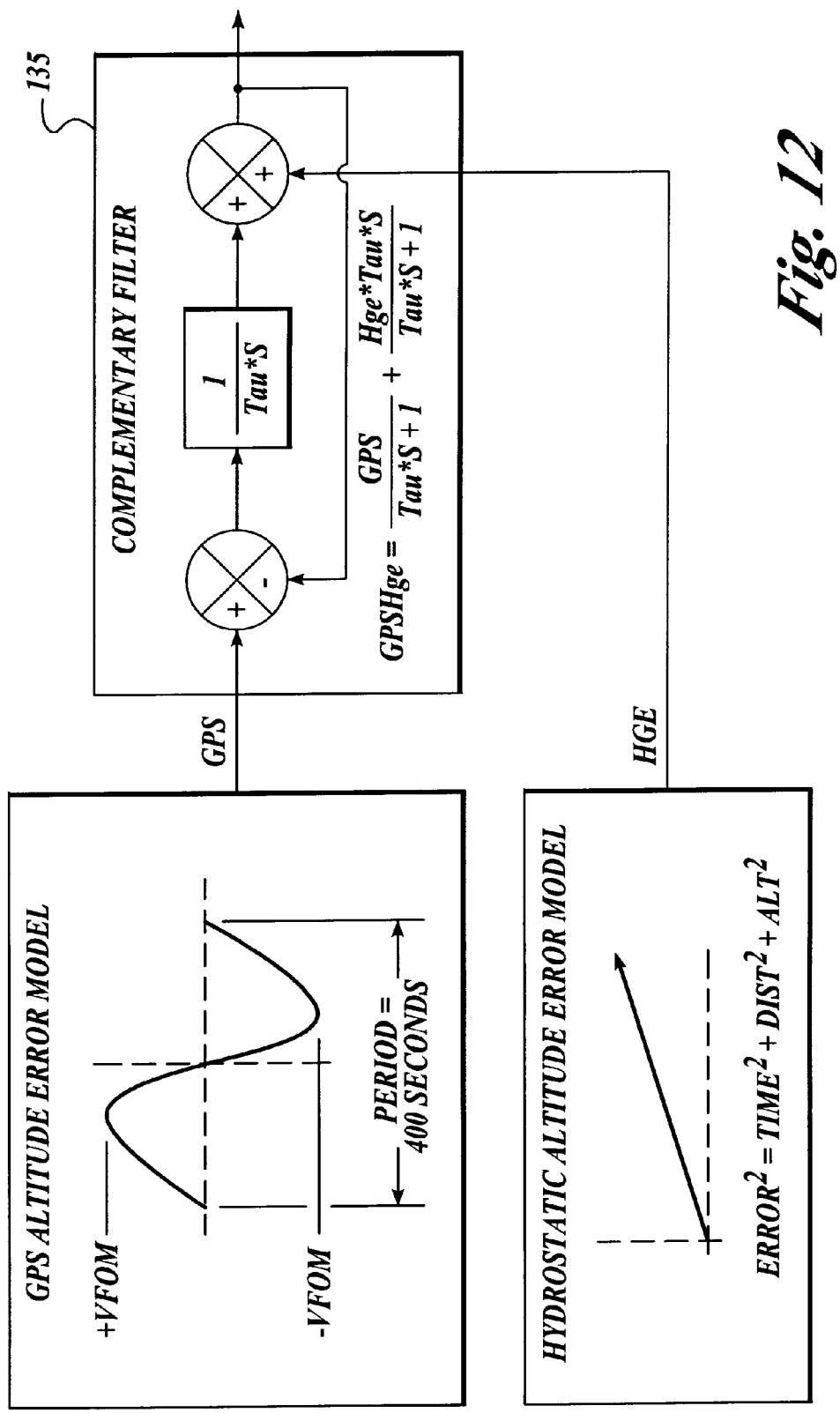
FIG. 12 depicts the block diagram of a complementary filter used to correct combined GPS altitude and hydrostatic pressure altitude.

A block diagram of the complementary filter 135 is depicted in FIG. 12. The filter time constant, Tau or $\tau$, is a function of the current GPS figure of merit. The lower the GPS VFOM, the lower the time constant. Therefore, the more accurate GPS is, the more quickly the output follows the GPS altitude. When accuracy of GPS degrades, the output more closely follows pressure altitude. When the GPS figure of merit increases, the filter stops tracking. This is accomplished by setting the time constant to infinity. At this point the filter output becomes:

$$GPSHge=Hge+K \qquad \text{Eq. 6}$$

where:
   K=the last attain correction value from the filter.
If the filter has been tracking for a long period of time then K=Hgps−Hge and GPSHge would equal Hgps at hold time 0.

At this point the GPSHge estimated figure of merit is set to GPS VFOM. While in this hold mode the estimated figure of merit is then allowed to drift based on the assumed error rates of hydrostatic altitude as described below. When the estimated GPSHge error exceeds the current GPS VFOM plus an additional factor, for example, 50 feet, then the filter again starts tracking. In addition, if the GPS VFOM improves below the current estimate, the filter tracks. While the GPS VFOM remains constant the filter will track. On ground, the filter is initialized with the difference between pressure altitude and runway elevation.

If power-up in the air, the filter is preset to the difference between GPS altitude and hydrostatic altitude. The filter is put into track mode. This results in the output being GPS altitude and VFOM is equal to GPS VFOM. As described in the GPS section, the largest error in GPS altitude is due to the effects of SA. By choosing a time constant large enough the effects of SA are reduced. In addition, the GPS VFOM typically increases during periods of large SA errors. Since the filter does not track during these times the SA errors do not affect the filter.

Estimating Errors—GPS Calibrated Hydrostatic Altitude

The errors in GPS calibration of hydrostatic altitude are basically the GPS VFOM at calibration and the variation of altitude estimating errors. On the ground, as stated above, the error is the error in the runway elevation. Once in the air, if the filter is tracking, the error is GPS VFOM. If the filter is holding, the error is based on the following:

1. Time since last track 137.
2. Distance traveled since last track 139.
3. Altitude changes since last track 141.
4. GPS VFOM at last track 143.

Item numbers 1 through 3 are based on the hydrostatic altitude error rate and, therefore, match them. For example, the initial values being used are:
   Time=50 feet per hour;
   Distance=1.5 feet per nm's;
   Altitude changes=10 feet for each 1000 foot of altitude change.

Because the above errors are uncorrelated, the RSS method is used to arrive at the final VFOM as shown below:

$$VFOM=\sqrt{time^2+dist^2+alt^2+GPSVFOMhold^2} \quad Eq.\ 7$$

As an example, consider a flight in which altitude was last calibrated at 3000 feet, 10 nm's from the runway. Also assume that it takes the aircraft 5 minutes to arrive at the airport. Also assume that GPS altitude VFOM was 250 feet at calibration. The estimated accuracy upon arrival is given by:

$$VFOM=\sqrt{(50*0.067)^2+(10*0.5)^2+(3000*0.01)^2+(250)^2}$$

VFOM=251 feet.

Radio Altitude Calibration of Hydrostatic Altitude

Hydrostatic altitude can also be calibrated using radio altitude on approach. This is most useful over fairly flat terrain where it can result in a very accurate calibration value and can help to improve the overall accuracy close to the runway when accuracy is needed most. FIG. 7 and FIGS. 8A through 8F depict the block diagram 145. The calibration value is based on the current value of radio altitude and the average terrain database value 147 under the aircraft. The equivalent area on the terrain database covered by the radio altimeter is a function of the aircraft's height, the database resolution, the antenna pattern, and radio altitude processing algorithm, i.e. leading edge tracking and averaging. For example, the EGPWS terrain database provides a "9 cell area" around the aircraft's current position in which the database is broken into 9 equal size squares in a 3×3 pattern, oriented with true north, with the aircraft occupying the central square. The "9 cell area" refers to the 9 squares around the aircraft's current position. In order to simplify the calculations, the 9 cell area around the current aircraft's position is averaged to determine the database value to use. The correction value is then:

$$Error=Hr+DBelev-Hge \quad Eq.\ 8$$

where:
  Error=the error correction factor
  Hr=Radio Altitude Value
  DBelev=9 cell average terrain database value
  Hge=Hydrostatic Altitude.

Calibration of hydrostatic altitude is only done when the aircraft is in approach mode, the radio altitude is less than 2000 feet, the wings are level, and the aircraft is within 10 nautical miles of the runway 149. After a calibration is completed, it is not repeated unless a more accurate calibration value is obtained as described below. Radio altitude calibrated hydrostatic altitude is set invalid until the first calibration is completed. It then remains valid 151 until the aircraft lands.

Estimated Database Accuracy

The estimated accuracy of the calibration is primarily a function of the database accuracy, resolution and flatness. An estimate of the flatness of the terrain is obtained by calculating the standard deviation of the 9 cell database values. This is added to a fixed estimate based on database resolution. Lower values for higher resolution. If the calculations determine that the aircraft is over water, i.e. standard deviation=0 and average elevation=0, the estimated database accuracy is set to zero. When the calibration is completed, the estimated database accuracy is latched, as well as the current aircraft position, altitude, and system time. This calibration value is used until such time as the aircraft passes over an area with a higher estimated database accuracy, at which time the calibration will be repeated.

Estimating Errors—Radio Altitude Calibration of Hydrostatic Altitude

The errors in radio altitude calibration of hydrostatic altitude are primarily the accuracy of the calibration and the variation of hydrostatic altitude estimating errors with time, distance and altitude. The error is based on the following:
  1. Time since last calibration 153;
  2. Distance traveled since last calibration 155;
  3. Altitude changes since last calibration 157;
  4. Estimated database accuracy at last calibration 159; and
  5. Estimated radio altitude accuracy 161.

Items 1 through 3 are based on the hydrostatic altitude error rate and therefore match them. For example, the initial values used are:
  Time=50 feet per hour;
  Distance=1.5 feet per nm's;
  Altitude changes=10 feet for each 1000 foot of altitude change;
  Database accuracy is as described above; and
  Radio altitude accuracy=50 feet.

Because the above errors are uncorrelated, the RSS method is used to arrive at the final VFOM as shown below:

$$VFOM=\sqrt{time^2+dist^2+alt^2+Database^2+RadAlt^2} \quad Eq.\ 9$$

As an example consider a flight in which altitude was last calibrated at 2000 feet, 8 nautical miles from the runway. Also assume that it takes the aircraft 5 minutes to arrive at the airport. Also assume that database was estimated to be accurate to within 100 feet at the calibration. The estimated accuracy upon arrival is given by:

$$VFOM=\sqrt{(50*0.067)^2+(8*0.5)+(2000*0.01)^2+(100)^2+(50^2)}$$

VFOM=114 feet.

Corrected Barometric Altitude

As stated above, corrected barometric altitude is the input currently used by the EGPWS for altitude. Also as stated above, corrected barometric altitude can suffer from significant errors during non-standard atmospheric conditions, and because the pilot inputs the pressure correction, human error is introduced. Use of QFE correction can cause problems with the EGPWS which expects the altitude to be referenced to mean sea level. On the other hand, close to the runway, and ignoring QFE or pilot error, the corrected barometric altitude is likely to be the most accurate altitude signal available. Therefore, if it is available on the aircraft, corrected barometric altitude is part of the blended altitude solution. FIG. 9 and FIGS. 10A through 10F depict the block diagram 163 for correcting barometric altitude.

Temperature Correction—Barometric Altitude

One major source of error in the corrected barometric altitude signal is due to non-standard atmospheric temperature. By applying a correction factor 165 based on the difference between predicted ISA temperature and the temperature at the aircraft, the invention significantly reduces the error in the corrected barometric altitude signal. Analysis has shown that on average a 50% reduction in the amount of error is obtained. The following derives the formula used for the temperature correction for standard atmosphere, the pressure versus height model is:

$$htp = \frac{T0}{LM} \cdot \left[1 - \left(\frac{P}{P0}\right)^{\left(\frac{LM \cdot R}{G0}\right)}\right] \quad \text{Eq. 10}$$

where:

T0=ISA assumed sea level temperature—288.15 degs K

LM=ISA assumed lapse rate—0.0065 degrees K/m

P0=ISA assumed sea level pressure—1013.25 millibars

G0=ISA assumed sea level acceleration due to gravity—9.80665 m/sec ^2

R=Gas constant for dry air—287.05 meters^2-kg/deg K-kmol-sec^2

P=Indicated Pressure in millibars.

Eq. 10 assumes a standard temperature lapse rate and a standard sea level temperature. A more accurate altitude is obtained when the actual sea level temperature is known. Thus, non-standard temperature days, i.e. hotter or colder than 288.15 degrees K, are accommodated. Modifying Eq. 10 as follows accomplishes this:

$$htp = \frac{T0_{act}}{LM} \cdot \left[1 - \left(\frac{P}{P0}\right)^{\left(\frac{LM \cdot R}{G0}\right)}\right] \quad \text{Eq. 11}$$

where:

T0act=Actual sea level temperature in Degs K.

Eq. 11 provides an accurate height as long as the temperature lapse rate remains standard by correcting for a constant temperature offset. In practice, obtaining the actual sea level temperature is difficult. Actual sea level temperature is estimated from the current measured temperature at the aircraft which is obtained from static air temperature. The estimated sea level temperature is then obtained by using the standard lapse rate and the aircraft's current pressure altitude as shown below:

$$T0act = SAT + hp*LM \quad \text{Eq. 12}$$

where:

SAT=Static Air Temperature in Degs K

Hp=Pressure Altitude (Equation)

LM=ISA assumed lapse rate—0.0065 deg K meter.

Substituting Eq. 12 into Eq. 11:

$$htp = \frac{(SAT + hp \cdot LM)}{LM} \cdot \left[1 - \left(\frac{P}{P0}\right)^{\left(\frac{LM \cdot R}{G0}\right)}\right] \quad \text{Eq. 13}$$

To arrive at an equation of the desired form:

$$htp = hp*k$$

the following equivalency is used:

$$\frac{htp}{hp} = \frac{\frac{(SAT + hp \cdot LM)}{LM} \cdot \left[1 - \left(\frac{P}{P0}\right)^{\left(\frac{LM \cdot R}{G0}\right)}\right]}{\frac{T0}{LM} \cdot \left[1 - \left(\frac{P}{P0}\right)^{\left(\frac{LM \cdot R}{G0}\right)}\right]} \quad \text{Eq. 14}$$

Simplifying and solving for htp results in:

$$htp = hp \cdot \left(\frac{SAT + hp \cdot LM}{T0}\right) \quad \text{Eq. 15}$$

Eq. 15 is the formula used to temperature correct barometric corrected altitude. As stated above, temperature corrected barometric corrected altitude only corrects for a temperature offset, not for non-standard lapse rates due to temperature inversion and other non-standard atmospheric conditions.

Detecting Temperature Instabilities

The accuracy of the corrected barometric altitude is degraded during non-standard atmospheric conditions. The temperature correction above reduces the error for temperature offset but does not improve accuracy during non-standard lapse rates. Non-standard lapse rates and large temperature changes are indicative of an unstable atmospheric condition. Detecting this non-standard temperature condition improves the assessment of the accuracy of the altitude measurement. As shown in the block diagram in FIG. 9 and FIGS. 10A through 10F, detecting this non-standard temperature condition is accomplished by computing the difference between the current rate of change of temperature 167 with the predicted rate of change of temperature 169 from the standard atmosphere models. Large differences indicate a non-stable condition, and therefore the estimated accuracy of the computed altitude is reduced. The function generator of the present invention provides the reduced estimated accuracy of the computed altitude. The values for the function generator 171 are based on the results of simulation and flight test.

QFE Operation

There still exist today some countries using the QFE pressure setting standard (zero used as airport altitude), not the more familiar QNH setting (MSL reading used for airport altitude) where the altimeter is set to indicated elevation of the airport. QFE setting adjusts the pressure altimeter to read zero on the runway. Since the EGPWS requires the altitude to be referenced to mean sea level, this can cause nuisance alarms. As of today, China, most of the ex Soviet block countries, and a few military fields are still using the QFE standard. One of the challenges to solving this problem is knowing when the pilot has selected a QFE setting. This information is not normally available on the aircraft. Therefore the EGPWS is left to guess when QFE has been selected. This is easy if the airline always operates QFE even outside of the normally QFE areas, like American Airlines. But this becomes more of a challenge for operators who normally operate QNH, but must operate QFE when going into, for example, China. If the QFE airport is at a significant altitude above sea level, the invention detects when QFE has been selected. For example, if the airport is at 5000 feet above mean sea level (MSL), when the pilot selects the QFE setting, corrected barometric altitude is in error as compared to GPS altitude by somewhere around 5000 feet. If on the other hand, the airport is at 400 feet MSL, the difference of 400 feet is within the normal error tolerance of GPS altitude.

As will be discussed later under reasonableness checks, the 5000 foot QFE airport automatically causes the corrected barometric altitude signal to be excluded from the final solution. Excluding the corrected barometric altitude signal would typically be enough to solve the problem. But the invention does not exclude the corrected barometric altitude signal when close to the runway since it will typically be the most accurate altitude signal. Therefore it is desirable to correct the altitude back to QNH if possible, allowing it to be used. As depicted correction of the altitude back to QNH is accomplished when the invention has determined that this is a QFE area and that the aircraft is below the transition altitude. In addition, the invention has already detected that the corrected barometric altitude is unreasonable. At this point the nearest runway elevation is added to the corrected barometric altitude, and this new altitude is checked for reasonableness. If this new altitude passes the reasonableness test, the invention uses it in the final altitude solution.

The use of the nearest runway may cause the EGPWS to pick the wrong runway altitude to use, but this would typically only occur at some distance from the runway. In addition, the runway altitude still must pass the reasonableness test. As the aircraft approaches the runway the odds of the EGPWS picking the correct runway increases. Additionally, the areas were QFE is still used have very few runways, therefore the odds of picking the wrong runway are greatly reduced. A QFE area flag is added to the EGPWS runway database to reduce the chances of mistakenly using QFE when the airport is not a QFE area. As discussed earlier, airports between 200 and 500 feet MSL may not trip the QFE logic 173. Because the final altitude solution is blended, the actual effect of a 500 foot altitude error on corrected altitude is reduced, depending on the predicted accuracies of the other altitude signals.

Estimating Errors—Barometric Corrected Altitude

Because the pilot corrects the altitude to the local pressure setting and typically the local pressure setting is on the destination runway, the estimated error in corrected altitude is based on distance and height above the runway. Since corrected altitude assumes a standard atmosphere, the errors in the vertical axis are significantly worse than those assumed by the pressure altitude calculation. In addition, the errors are not linear: the error rate is larger closer to the ground due to the more complicated interactions of the atmosphere with the ground than at altitude. By applying temperature correction, the invention reduces the overall error rate on the order of about 50%. To accomplish this overall error rate reduction, an example 3 level error rate is used as depicted below.

Height above runway error:
<6000 ft above runway=50 feet per 1000 feet;
>6000 ft to 18000 ft above runway=40 feet per 1000 feet;
>18000 ft above runway=20 feet per 1000 feet.

In addition, an example error factor is added based on distance to the runway:
distance to runway error=1.0 feet per nautical mile.

Also as described above, an additional factor is added based on the current predicted instability of the atmosphere based on the rate of change of atmospheric temperature. And an example basic error factor of 50 feet is used to accommodate altimeter errors and other equipment errors. Because the above errors are uncorrelated, the RSS method is used to arrive at the final VFOM 175 as shown below:

$$VFOM = \sqrt{dist^2 + alt^2 + Instability^2 + Basic^2} \qquad \text{Eq. 16}$$

As an example, on approach at reaching 18000 feet, 50 nautical miles from the runway, assuming the runway is at sea level and no instability has been predicted, the estimated accuracy of corrected altitude is given by:

$$VFOM = \sqrt{\left[\left(\frac{6000*50}{1000}\right) + \left(\frac{(18000-6000)*40}{1000}\right)\right]^2 + (1.0*50)^2 + 50^2}$$

$$VFOM = 783 \text{ feet or } +/- 4.3\%.$$

Upon reaching 3000 feet at 10 nautical miles, this reduces to: VFOM=158 feet or +/−5.3%. As can be seen, the estimated accuracy improves closer to the runway, this is the expected relationship using corrected barometric altitude.

Reasonableness Checking

Figure 11A:
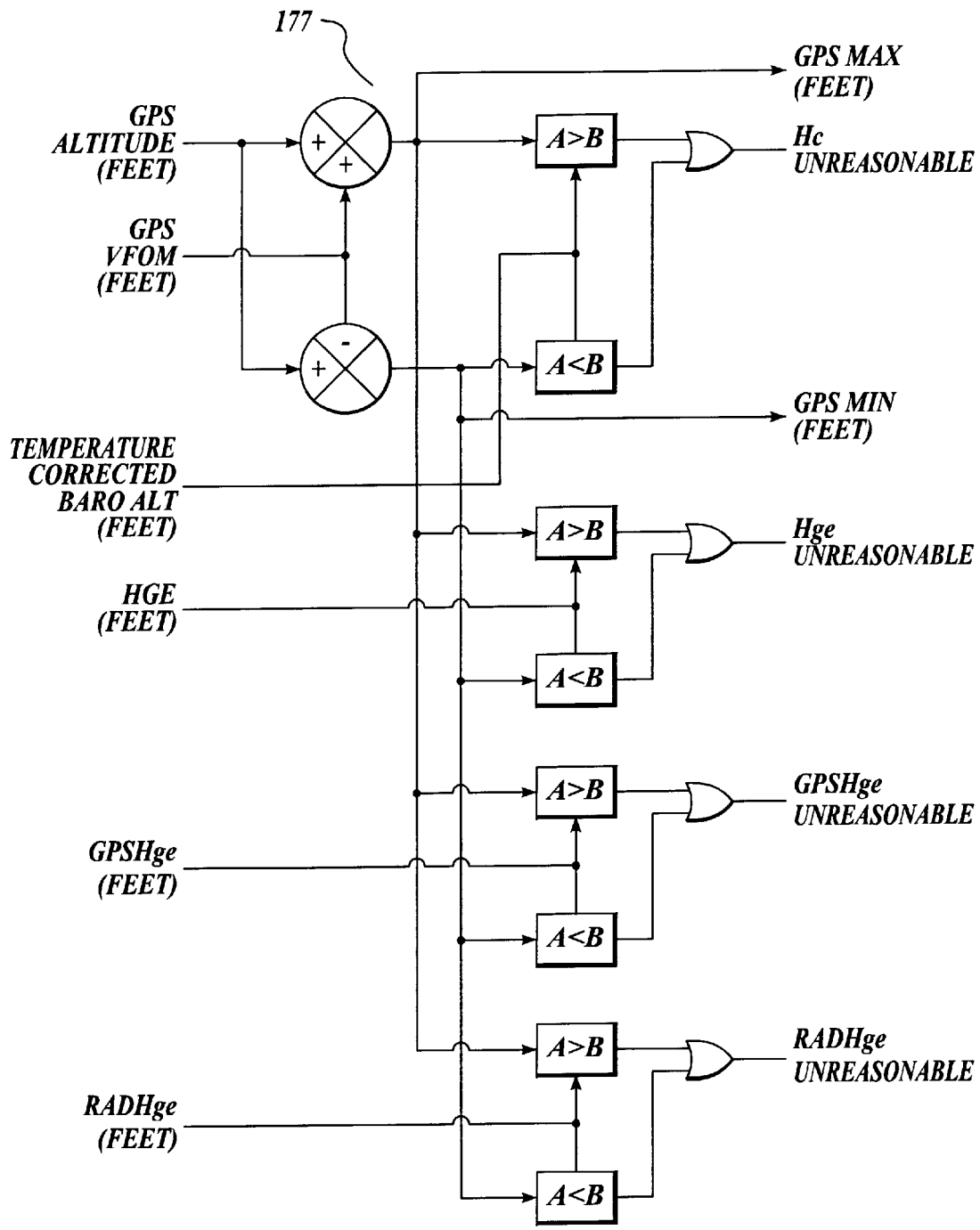
FIG. 11A depicts the logic diagram of a reasonableness check.

To ensure that unreasonable values are not used in the final altitude solution, a reasonableness check is performed on all inputs before they are used. Since GPS altitude contains a fairly accurate estimate of its current accuracy, it is used as the baseline altitude to check against. As shown in FIG. 11A, a maximum and minimum altitude window 177 is formed using GPS altitude and GPS VFOM. Each altitude is checked against this window. If the check fails, the altitude is set unreasonable and is not used in the final altitude solution. Because of SA the GPS altitude error will sometimes approach the VFOM value, in those cases an altitude that is actually more accurate than GPS could be discarded. According to one embodiment of the invention, the invention enlarges the window by multiplying VFOM by an additional factor to avoid discarding a more accurate altitude signal. An example of this additional factor is 1.5. According to an alternative embodiment of the invention, the invention uses VIL in place of VFOM. VFOM is basically a 2 sigma value, where as VIL is a 3 sigma value.

Figure 11B:
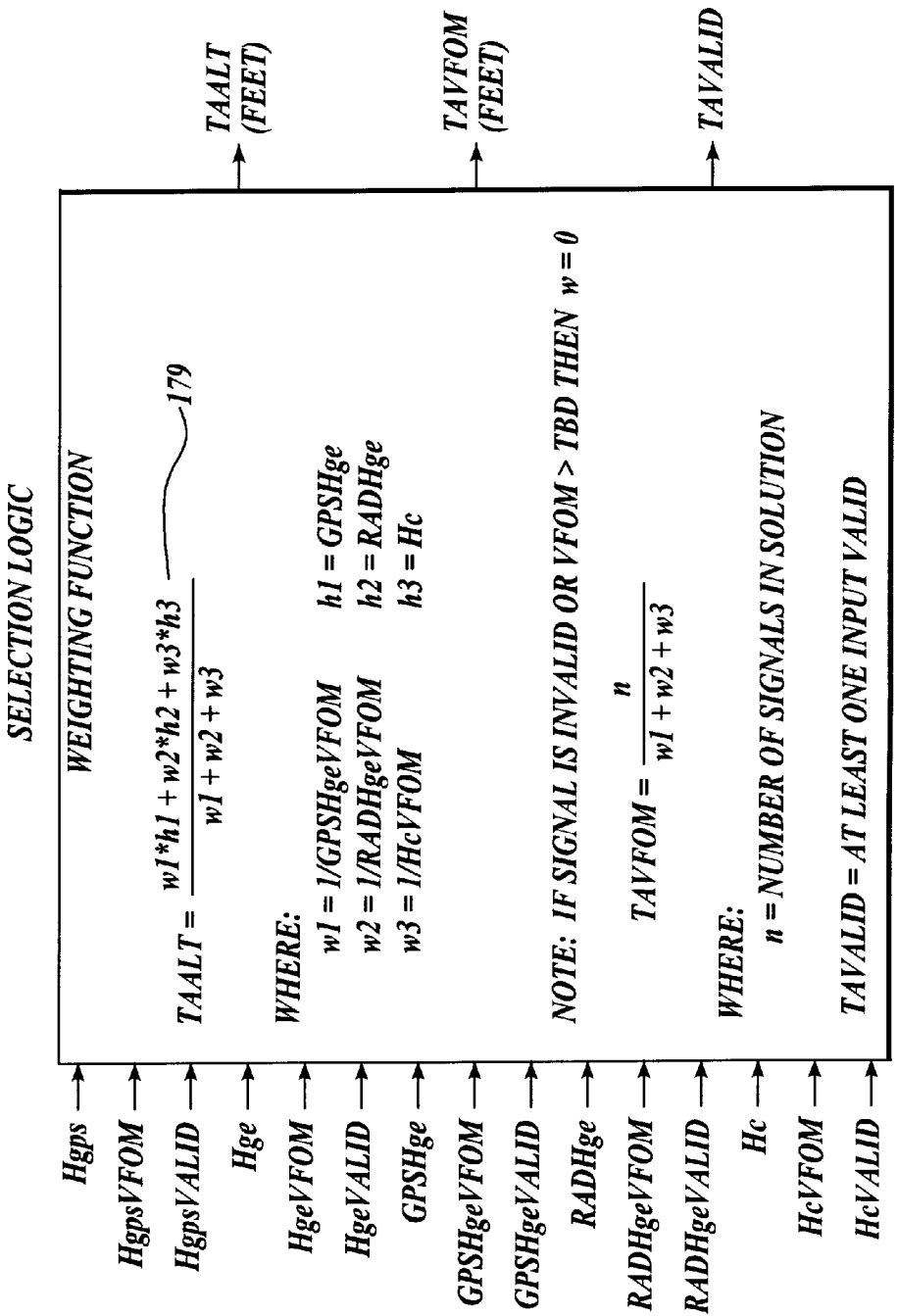
FIG. 11B depicts the logic of a final signal selection process.

According to yet another embodiment of the invention, FIG. 11B shows one algorithm 179 for accomplishing detecting the effects of SA on the GPS altitude. Taking the difference between GPS altitude and hydrostatic altitude leaves an error value that is made up of many parts. On the GPS side, the error is primarily composed of two parts. The first and largest error source is the SA effect of dithering the clock, which appears as a random slowly varying error with a period of about 500 seconds. A secondary error is due to atmospheric effects and satellite geometry.

The hydrostatic altitude error, at least during level flight, is primarily due to traversing pressure gradients and appears as a very slow ramping error. The invention applies a bandpass filter 181 to this error value centered on the SA dithering frequency which detects the effects of a large SA error. One embodiment of the invention uses a fixed bandpass frequency center on 0.002 HZ. Another embodiment uses an adaptive filter which finds the center frequency of the dither frequency.

Final Altitude Blending

One embodiment of the invention chooses the valid altitude with the lowest estimated figure of merit as a method of final altitude blending. Another embodiment averages the various altitude signals. Yet another embodiment of the invention weights each of the altitude signals in the final solution based on the current estimated accuracy of each signal. This weighting gives the most weight to those altitude signals which the invention currently estimates to be of the highest quality but does not totally ignore any altitude signal in the altitude final solution. This weighting minimizes the effect of errors in one altitude signal on the final solution. Weighting also prevents significant jumps in the altitude as the figures of merit change. The formula for the weighted average is as follows:

$$Alt = \frac{GPSHge*w1 + Hc*w2 + RADHge*w3}{w1 + w2 + w3} \quad \text{Eq. 17}$$

where:

GPSHge=GPS Corrected Hydrostatic Altitude
Hc=Corrected Barometric Altitude
RADHge=Radio Altitude Calibration of Hydrostatic Altitude
w1=GPSHge VFOM
w2=1/RADHge VFOM
w3=1/Hc VFOM.

Note: if a signal is invalid or unreasonable it is not included in the weighted average. The resultant estimated accuracy of the weighted average is calculated as follows:

$$VFOM = \frac{1}{w1 + w2 + w3} \quad \text{Eq. 18}$$

Figure 11C:
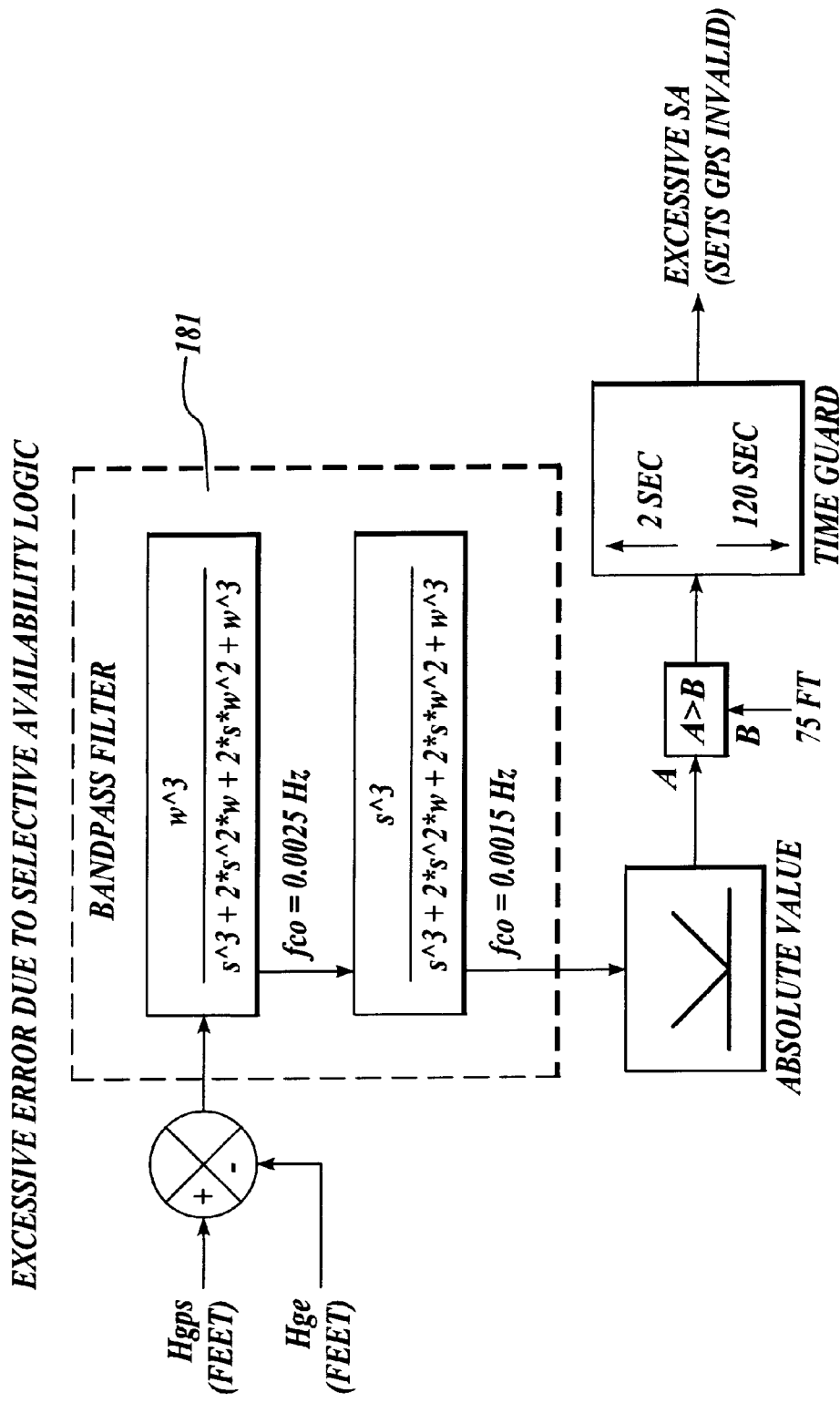
FIG. 11C depicts a logic diagram for determining whether selective availability is excessive.

This is also depicted in FIG. 11C.

Further Aspects of the Invention

While the discussion above primarily focuses on supplementing pressure altitude with other altitude estimating techniques to arrive at an improved altitude estimation, it is to be appreciated that one aspect of the invention comprises combining a first altitude estimation method with a second altitude estimate to arrive at an improved altitude estimate. The combination preferably takes into account the source of errors of the first and second altitude estimation methods, and weights the contribution of each method of estimation according to the amount of error of each, in the manner described.

Another aspect of the invention includes a method and apparatus for determining altitude. The method comprises correcting estimated geometric altitude using information from a global positioning satellite system (GPS). In one embodiment, the information from the global positioning satellite system comprises GPS altitude information, and is the only information used to correct the estimated geometric altitude. The estimated geometric altitude can comprise an estimated based on any of pressure altitude, corrected or uncorrected, radio altitude, and other methods of estimating altitude, as indicated in the method described above.

Analysis of Complementary Filter Time Constants

As described in the hydrostatic altitude section, hydrostatic altitude is highly accurate for measuring relative vertical changes over short periods of time and distance, such as during take-off and approach. Hydrostatic altitude does not provide an absolute altitude and is prone to significant errors over extended periods of time and distance due to the effects of pressure gradients and long-term integration errors.

In addition, as described in the GPS altitude section, GPS altitude is highly accurate in the long-term but short-term accuracy suffers from the introduction of selective availability on the GPS signal.

Given the above it would therefore be desirable to come up with a method of using the best parts of each of the above. This is accomplished by combining GPS altitude and hydrostatic altitude through a complementary filter. The complementary filter is dynamically optimized to reduce errors in GPS altitude caused by selective availability while minimizing pressure gradient and drift errors of hydrostatic altitude.

Since the error conditions on the inputs to the filter are dynamically changing, the filter time constant Tau or $\tau$, is dynamically calculated. A simplified method based on just the estimated accuracy of GPS altitude (VFOM) can be used or a somewhat more optimal calculation can be performed which uses estimated accuracies for both inputs to the filter.

As described above, selective availability is the largest contributor (~75%) to the GPS error. The error due to selective availability (SA) can be modeled as a sine wave with peak amplitude defined by the GPS VFOM value. The period of this sine wave is taken to be the typical SA frequency of 0.015 radians per seconds.

Hydrostatic altitude is computed by the real time integration of the hydrostatic equation. As such it is subject to a slow drift type errors due to pressure gradient errors etc. For level flight the error rate is primarily due to the pressure gradient errors and therefore is a function of the rate of change of atmospheric conditions which itself is a function of both time and aircraft speed. A larger error rate is encountered during climb and descent due to the errors in the measurement of pressure and temperature.

FIG. 12 depicts the complementary filter and the error model.

The configuration of the complementary filter results in a low pass filter on GPS altitude and a high pass filter on hydrostatic altitude.

The low pass filter on GPS altitude results in the following minimum value:

$$ErrorGPS \approx \frac{VFOM}{\sqrt{1 + \Omega^2 * \tau^2}}$$

Where:

VFOM=GPS VFOM
$\Omega$=Estimated error frequency due to selective availability
$\tau$=Filter time constant The high pass filter on hydrostatic altitude results in the following minimum value after a few time constants:

$$ErrorHydrostatic \approx D*\tau$$

Where:

D=Estimated error rate of hydrostatic altitude
$\tau$=Filter Time constant

Since the error on GPS altitude and the error on hydrostatic altitude are uncorrelated the overall error when combined is:

$$Error \approx \sqrt{\left(\frac{VFOM}{\sqrt{1+\Omega^2 * \tau^2}}\right)^2 + (D*\tau)^2}$$

The minimum error value is then the point at which the derivative of the above is zero, and the optimum Tau value can be found at this point as follows:

$$\frac{d}{d\tau}Error = 0$$

This results in the following expression for the minimum error value:

$$Error \min \approx \sqrt{\frac{D*(2*VFOM*\Omega - D)}{\Omega^2}}$$

And the corresponding Tau value at that minimum:

$$\tau Optimum \approx \frac{\sqrt{\frac{VFOM*\Omega - D}{D}}}{\Omega}$$

Therefore the optimum Tau value is a function of the estimated error in GPS altitude (VFOM) as well as the estimated error in the hydrostatic altitude.

Assuming typical ground speeds and climb/descent rates for civilian aircraft types hydrostatic altitude error rates of 0.1 feet per second for level flight and 0.3 feet per second for climb/descent are calculated. Given the small difference between these two values a simplified Tau calculation can be derived that only looks at GPS VFOM.

FIGS. 13 through 16 show various plots using the above equations.

Figure 13:
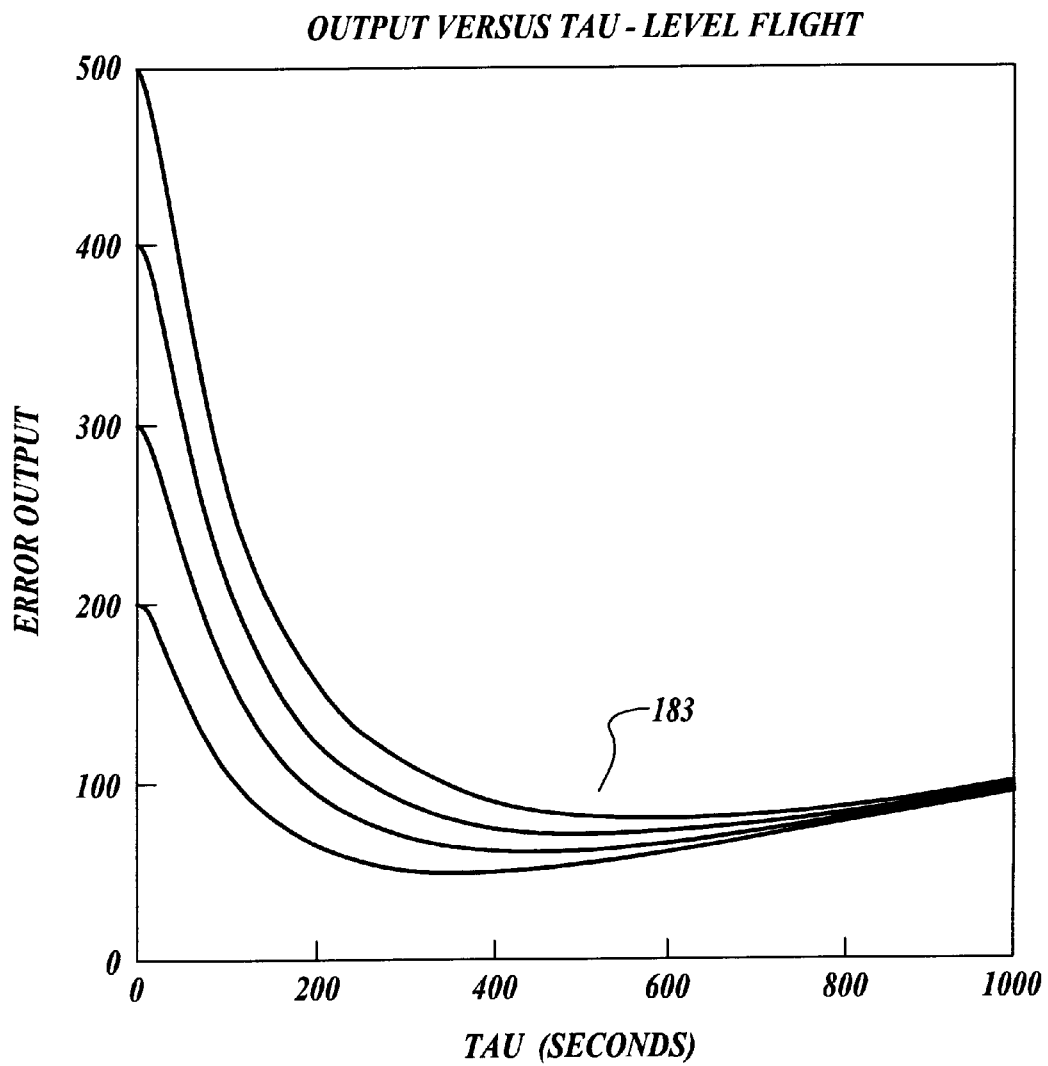
FIG. 13 depicts a graph of time constants Tau as a function of Error output VFOM during level flight.
Figure 14:
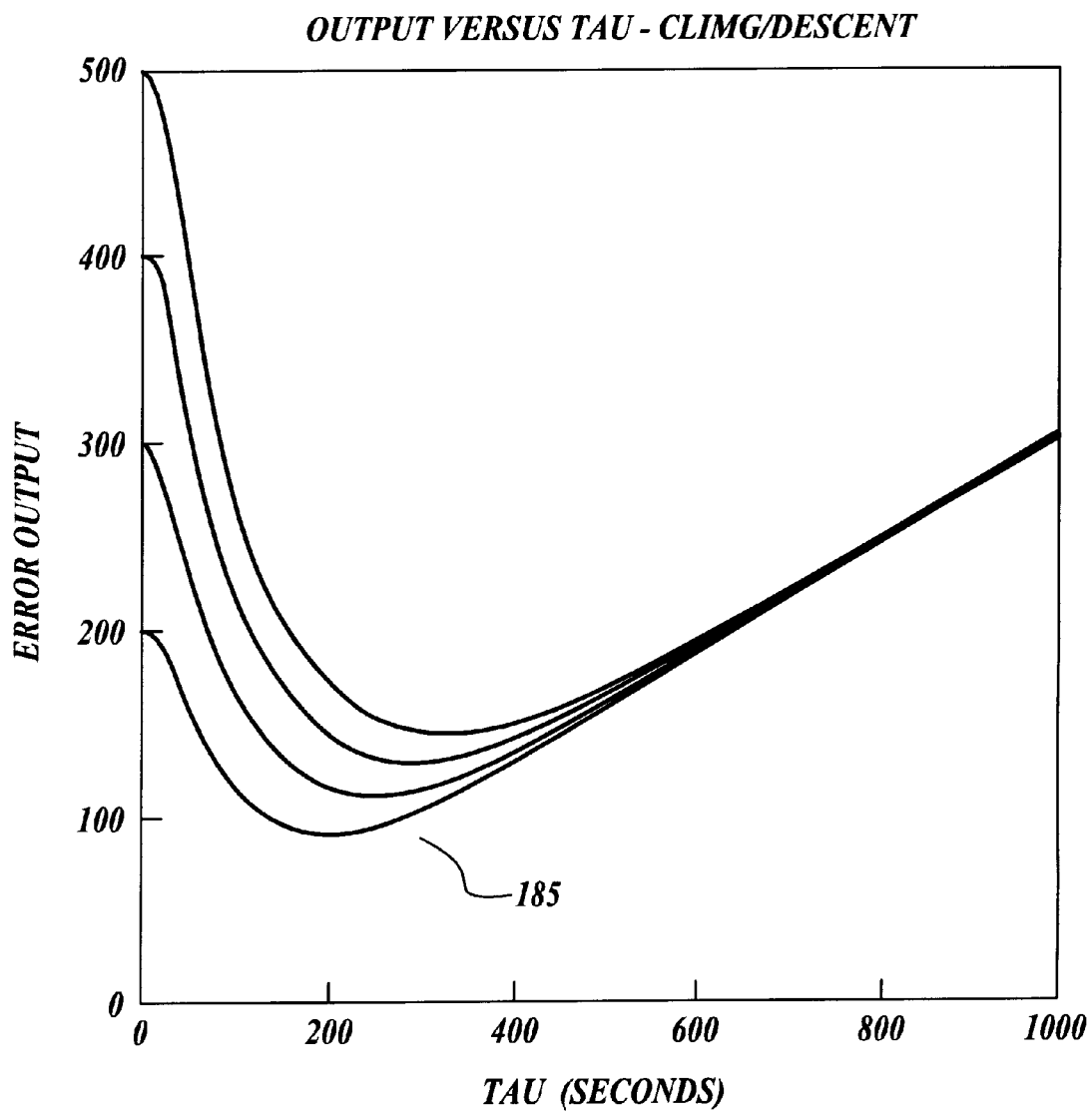
FIG. 14 depicts a graph of time constants Tau as a function of Error output VFOM during climb and descent flight.
Figure 15:
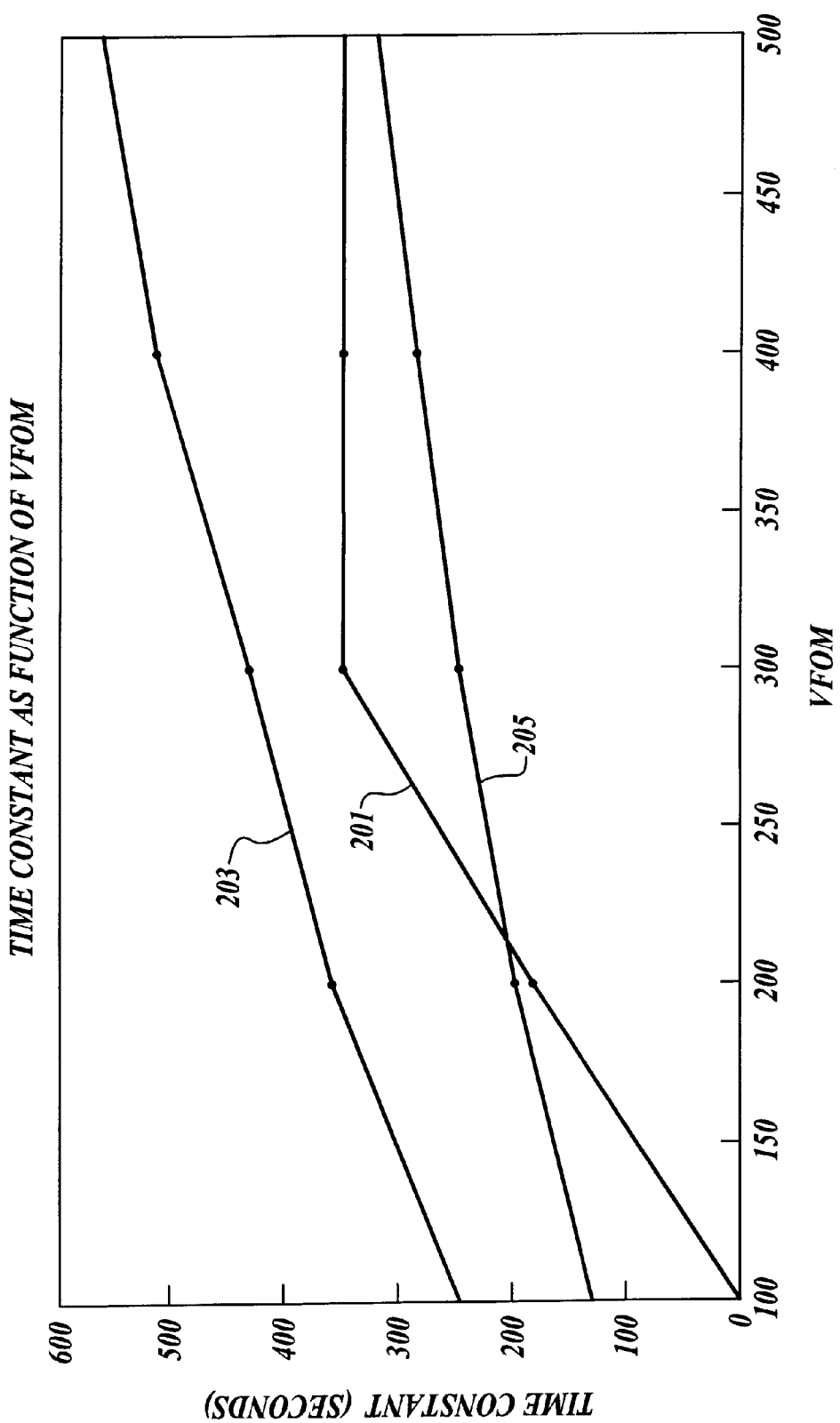
FIG. 15 depicts a graph showing optimized time constant Tau values as compared to pre-selected Tau values.
Figure 16:
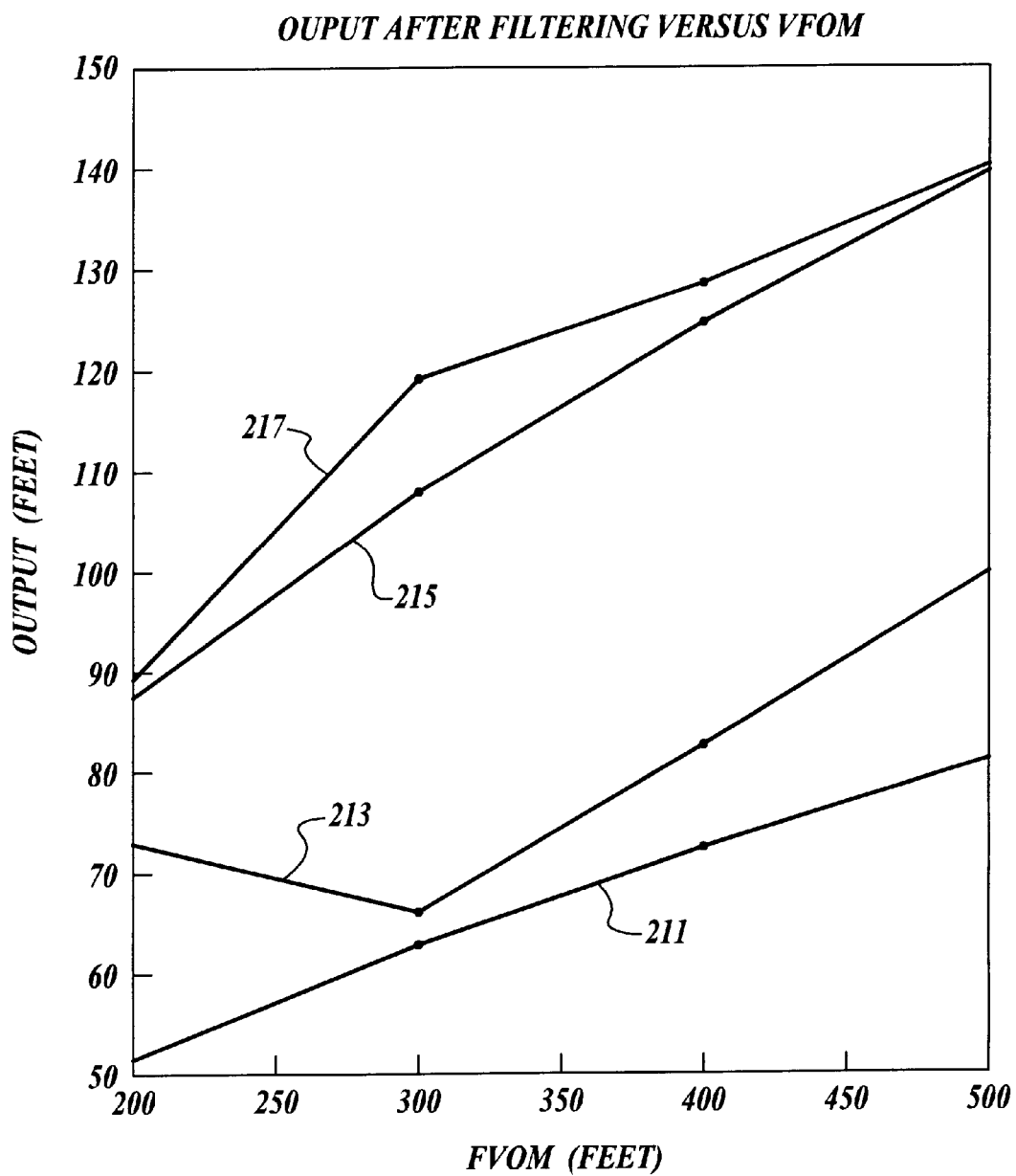
FIG. 16 depicts a graph showing predicted filter output values for optimized time constant Tau values as compared to pre-selected or standardized Tau values.

In FIG. 13, for level flight it can be seen that increasing the time constant beyond 350 seconds brings 183 little additional benefit. For climb/descent (FIG. 14), a time constant between 100 and 300 seconds 185 achieves beneficial results for minimizing the error. This is shown graphically in FIG. 15, wherein line 201 showing pre-selected time constants linearly increasing, between VFOM of 100 and 300, and thereafter constant at approximately 350 seconds, is compared to the actual Tau values as shown in lines 203 and 205. Using the pre-selected Tau values of line 201 allows the system to use a look-up table versus performing the calculations described above. FIG. 16 shows the effect of using pre-selected Tau values versus performing the calculations. For level flight, line 213 shows the output when a calculated Tau is used; line 211 shows the output when a pre-selected Tau is used. For climbing flight, line 217 shows the output when a calculated Tau is used; line 215 shows the output when a pre-selected Tau is used. It can be seen that the output does not vary significantly depending on whether Tau is calculated or pre-selected.

It should be noted that as VFOM decreases, the need for the filter is reduced. In addition, the amount of selective availability effects is also expected to be reduced. For VFOM values of 100 feet or less, SA must not be turned on or Differential GPS must be in use.

Because of this a time constant based only on VFOM appears to be the best choice. It is picked to somewhat fit the above optimum filter at the 300 to 400 VFOM values that will typically be seen with SA on. In addition as VFOM reduces, the time constant will be drastically shorted until at a VFOM of 100 feet it becomes 1. This allows for future use with SA off of LAAS/WAAS/DGPS applications in which the filter will no longer be needed (i.e. system can use GPS altitude directly.)

The predicted results were then compared to real test data. The following looks at the results from flight-test data off a Kingair aircraft. The data includes 14 flights of greater than 1 hour in length for a total flight time of 35 hours. The data includes flights through non-standard temperatures, both hot and cold, as well as across significant pressure gradients. Also some typical days are included.

The results for raw GPS altitude 219, and two complementary filter implementations are shown, one using the "optimum" filter time constant 221 and one using the time constant based on just GPS VFOM 223.

Both the maximum error value and the standard deviation are given.

Figure 17:
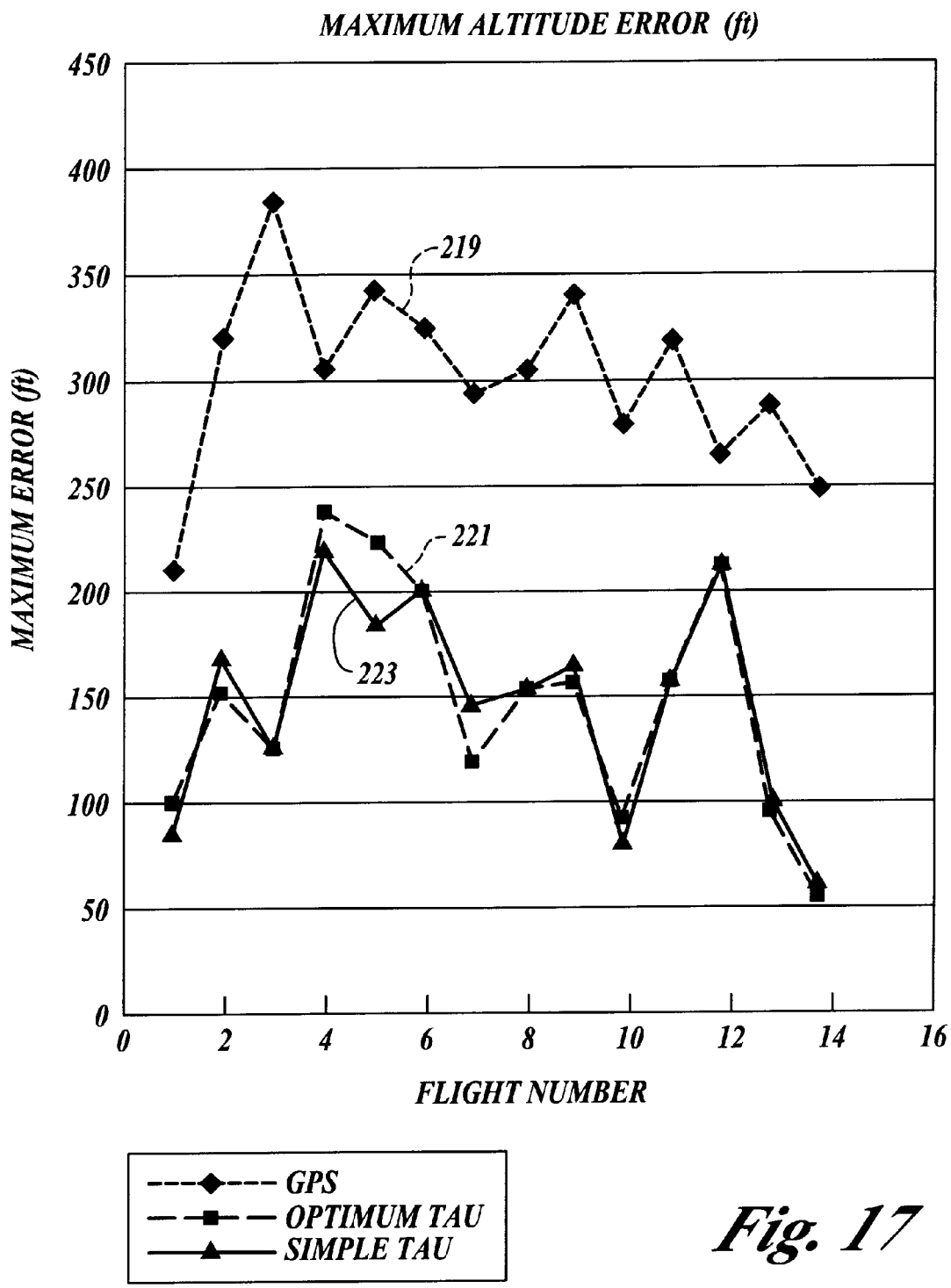
FIG. 17 is a graph of data which assists in understanding one or more aspects of the invention.
Figure 18:
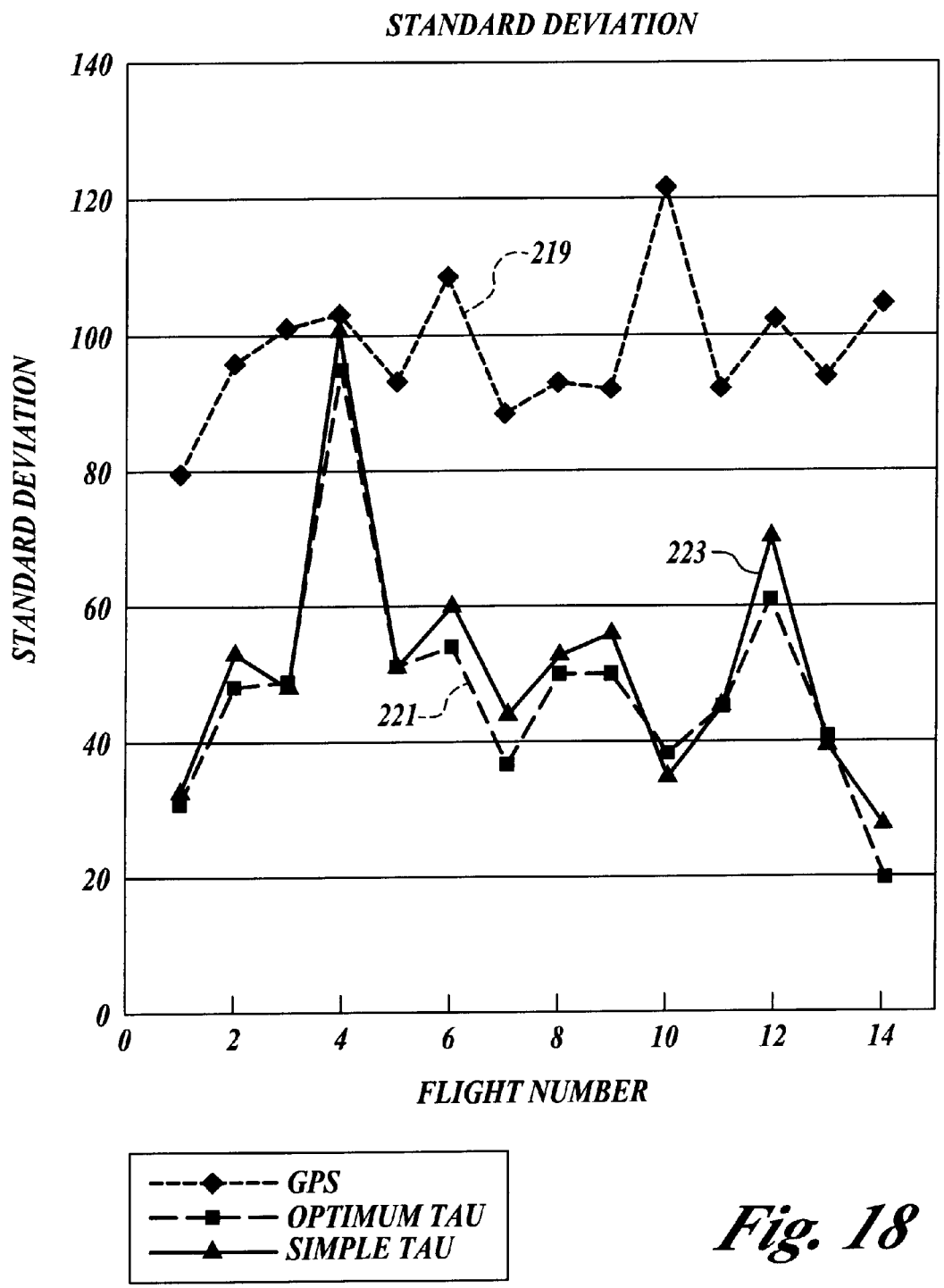
FIG. 18 is a graph of data which assists in understanding one or more aspects of the invention.

As can be seen in the graphs of FIGS. 17 and 18, on average the peak error and the standard deviation have been reduced by a factor of 2. The average maximum error on GPS is about 300 feet, this is reduced to about 150 feet with the complementary filter. The standard deviation for GPS is about 100 feet, this matches most published values for GPS with SA on. For the complementary filter this is reduced to about 50 feet.

It can also be seen that both implementations of the complementary filter time constant give good performance.

As can be readily appreciated by those of ordinary skill in the art of flight information processing, much of the flight information generated by various aircraft system components as well as flight information received from off aircraft systems include a validity signal and also an error value. The validity signal is commonly checked before the corresponding value is used by the system.

The invention has been described in compliance with the applicable statutes. Variations and modifications will be readily apparent to those of skill in the art. It is therefore understood that the invention is not limited to the specific features shown and described, since the disclosure comprises preferred forms of putting the invention into effect. The invention is therefore to be interpreted in light of the appended claims appropriately interpreted in accordance with the doctrine of equivalents

What is claimed is:

1. A method for determining a modified aircraft altitude signal, said method comprising:
   a. receiving an air temperature signal, a pressure altitude signal, a first validity signal associated with the pressure altitude signal, aircraft altitude and position signals, and an error signal and a second validity signal associated with the aircraft altitude and position signals;
   b. if the aircraft is below a predefined altitude, receiving a radio altimeter generated altitude signal and a third validity signal associated with the radio altimeter altitude signal;
   c. generating a hydrostatic altitude signal based on the received pressure altitude signal and the air temperature signal;
   d. correcting the received barometric altimeter signal based on the received air temperature signal and a flight crew setting;
   e. initializing the hydrostatic altitude signal;
   f. calculating an error signal for the corrected barometric altimeter signal based on a predefined basic error factor, a predefined atmosphere instability factor and a predefined airport database;

g. calculating an error signal for the received hydrostatic altitude signal based the initialization of the hydrostatic altitude signal;

h. calibrating the hydrostatic altitude signal based on the received aircraft altitude signal, the at least one error signal associated with the aircraft altitude signal and the calculated error signal for the hydrostatic altitude signal;

i. if the aircraft is below a predefined altitude, calibrating the hydrostatic altitude signal based on the received radio altimeter generated altitude signal and a predefined terrain elevation database;

j. calculating an error signal for the aircraft altitude calibrated hydrostatic altitude signal based on the most recent calibration of the hydrostatic altitude signal and calculating an error signal for the radio altimeter calibrated hydrostatic altitude signal based on the most recent radio altimeter calibration of the hydrostatic altitude signal;

k. determining a fourth validity of the aircraft altitude calibrated hydrostatic altitude signal based on said first received validity signal of the received pressure altitude signal and said second validity signal associated with the received aircraft altitude signal and determining a fifth validity of the radio altimeter calibrated hydrostatic altitude signal based on said first validity signal of the received pressure altitude signal;

l. determining reasonableness of the generated hydrostatic altitude signal, the aircraft altitude calibrated hydrostatic altitude signal, the radio altimeter calibrated hydrostatic altitude signal and the corrected barometric altimeter signal; and m. generating a modified aircraft altitude signal based on the reasonableness determinations, the fourth and fifth validity determinations, the first, second, and third received validity signals, the aircraft altitude signal, the calculated and received error signals, the generated hydrostatic altitude signal, the aircraft altitude calibrated hydrostatic altitude signal, the radio altimeter calibrated hydrostatic altitude signal and the corrected barometric altimeter signal.

2. A computer program product for performing the method of claim 1.

3. A method for determining a modified aircraft altitude signal, said method comprising:

a. receiving a pressure altitude signal, a first validity signal of the received pressure altitude signal, an aircraft altitude signal, and at least one error signal and a second validity signal associated with the aircraft altitude signal;

b. initializing the pressure altitude signal;

c. calculating an error signal for the pressure altitude signal based on the initialization of the pressure altitude signal;

d. calibrating the received pressure altitude signal based on the received aircraft altitude signal, the at least one error signal associated with the aircraft altitude signal and the calculated error signal for the pressure altitude signal;

e. calculating an error signal for the calibrated received pressure altitude signal;

f. determining a third validity of the calibrated received pressure altitude signal based on the received said first validity signal of the received pressure altitude signal and the received said second validity signal of the received aircraft altitude signal; and g. generating a modified aircraft altitude signal based on the determined said third validity of said calibrated received pressure altitude signal, the received aircraft altitude signal and the calibrated pressure altitude signal.

4. The method of claim 1, wherein c. calculating an error signal for the received pressure altitude signal comprises:

(i). receiving an aircraft position signal;

(ii). determining nearest runway based on received aircraft position signal and a predefined database of runways;

(iii). determining distance to and height above the determined nearest runway based received aircraft position signal and received aircraft altitude signal; and (iv). calculating the error signal for the received pressure altitude signal based on the received pressure altitude signal, a predefined altimeter error factor and the determined distance to and height above nearest runway.

5. The method of claim 4, wherein c.(iv). calculating the error signal for the received pressure altitude signal based on the received pressure altitude signal, a predefined altimeter error factor and the determined distance to and height above nearest runway, further comprises:

A. predicting current instability of the atmosphere; and

B. calculating the error signal for the received pressure altitude signal based on the predicted the current instability of the atmosphere.

6. The method of claim 1, wherein g. generating a modified aircraft altitude signal further comprises:

(i). if said first validity signal of the received pressure altitude signal indicates valid and said second validity signal of the received aircraft altitude signal indicates invalid, outputting the received pressure altitude signal as the modified aircraft altitude signal;

(ii). if said first validity signal of the received pressure altitude signal and said second validity signal of the received aircraft altitude signal indicate valid, generating a modified aircraft altitude signal based on the received pressure altitude signal and the calibrated pressure altitude signal; and (iii). if said first validity signal of the received pressure altitude signal indicates invalid and said second validity signal of the received aircraft altitude signal indicates valid, outputting the aircraft altitude signal as the modified aircraft altitude signal.

7. The method of claim 2, wherein g.(ii). generating a modified aircraft altitude signal based on the received pressure altitude signal and the received aircraft altitude signal comprises:

A. determining the lowest value of the calculated error signal for the received pressure altitude signal and the calculated an error signal for the calibrated received pressure altitude signal; and B. selecting the received pressure altitude signal or the received aircraft altitude signal with the determined lowest value as the modified aircraft altitude signal.

8. The method of claim 6, wherein g.(ii). generating a modified aircraft altitude signal based on the received pressure altitude signal and the received aircraft altitude signal comprises averaging the received pressure altitude signal and the received aircraft altitude signal.

9. The method of claim 6, wherein g.(ii). generating a modified aircraft altitude signal based on the received pressure altitude signal and the received aircraft altitude signal comprises:

A. generating a weighted value for the received pressure altitude signal and the calibrated received pressure altitude signal based on the calculated error signal for the received pressure altitude signal and the calculated error signal for the calibrated received pressure altitude signal, respectively; and B. combining the received pressure altitude signal and the calibrated received pressure altitude signal based on the generated weighted values.

10. A apparatus for determining a modified aircraft altitude signal, said apparatus comprising:

a. a receiving component for receiving pressure altitude signal, a first validity signal of the received pressure altitude signal, an aircraft altitude signal, and at least one error signal and a second validity signal associated with the received aircraft altitude signal;

b. an initializer for initializing the pressure altitude signal;

c. a pressure altitude error calculator for calculating an error signal for the pressure altitude signal based on the initialization of the pressure altitude signal;

d. a complementary filter for calibrating the received pressure altitude signal based on the received aircraft altitude signal, the at least one error signal associated with the aircraft altitude signal and the calculated error signal for the pressure altitude signal;

e. a calibrated pressure altitude error calculator for calculating an error signal for the calibrated received pressure altitude signal;

f. a validity determiner for determining a third validity of the calibrated received pressure altitude signal based on said first received validity signal of the received pressure altitude signal and said second received validity signal of the received aircraft altitude signal; and g. an aircraft altitude generator for generating a modified aircraft altitude signal based on the determined said third validity of the calibrated received pressure altitude signal, the received aircraft altitude signal and the calibrated pressure altitude signal.

11. The apparatus of claim 10, wherein the aircraft altitude generator further comprises:

(i). a first component for outputting the received pressure altitude signal as the modified aircraft altitude signal, if said first validity signal of the received pressure altitude signal indicates valid and said second validity signal of the received aircraft altitude signal indicates invalid;

(ii). a second component for generating a modified aircraft altitude signal based on the received pressure altitude signal and the calibrated pressure altitude signal, if said first validity signal of the received pressure altitude signal and the said second validity signal of the received aircraft altitude signal indicate valid; and (iii). a third component for outputting the aircraft altitude signal as the modified aircraft altitude signal, if said first validity signal of the received pressure altitude signal indicates invalid and said second validity signal of the received aircraft altitude signal indicates valid.

12. The apparatus of claim 11, wherein the second component comprises:

A. a determiner for determining the lowest value of the calculated error signal for the received pressure altitude signal and the calculated an error signal for the calibrated received pressure altitude signal; and B. a selector for selecting the received pressure altitude signal or the received aircraft altitude signal with the determined lowest value as the modified aircraft altitude signal.

13. The apparatus of claim 11, wherein the second component comprises an averaging component for averaging the received pressure altitude signal and the received aircraft altitude signal.

14. The apparatus of claim 11, wherein the second component comprises:

A. a weight generator for generating a weighted value for the received pressure altitude signal and the calibrated received pressure altitude signal based on the calculated error signal for the received pressure altitude signal and the calculated error signal for the calibrated received pressure altitude signal, respectively; and B. a combiner for combining the received pressure altitude signal and the calibrated received pressure altitude signal based on the generated weighted values.

15. The apparatus of claim 10, wherein the pressure altitude error calculator comprises:

(i). a second receiving component for receiving an aircraft position signal;

(ii). a runway determiner for determining nearest runway based on received aircraft position signal and a predefined database of runways;

(iii). a proximity determiner for determining distance to and height above the determined nearest runway based received aircraft position signal and received aircraft altitude signal; and (iv). an error calculator for calculating the error signal for the received pressure altitude signal based on the received pressure altitude signal, a predefined altimeter error factor and the determined distance to and height above nearest runway.

16. The apparatus of claim 15, wherein the error calculator further comprises:

A. an atmosphere predicting component for predicting current instability of the atmosphere; and B. a subcomponent for calculating the error signal for the received pressure altitude signal based on the predicted the current instability of the atmosphere.

17. A method for determining a modified aircraft altitude signal, said method comprising:

a. receiving a pressure altitude signal, a first validity signal of the received pressure altitude signal, an aircraft altitude signal, and at least one error signal and a second validity signal associated with the aircraft altitude signal;

b. initializing the pressure altitude signal;

c. calculating an error signal for the pressure altitude signal based on the initialization of the pressure altitude signal;

d. calibrating the received pressure altitude signal based on the received aircraft altitude signal, the at least one error signal associated with the aircraft altitude signal and the calculated error signal for the pressure altitude signal;

e. calculating an error signal for the calibrated received pressure altitude signal;

f. determining a third validity of the calibrated received pressure altitude signal based on the received said first validity signal of the received pressure altitude signal and the received said second validity signal of the received aircraft altitude signal;

g. determining reasonableness of the received pressure altitude signal and the calibrated received pressure altitude signal; and h. generating a modified aircraft altitude signal based on the determined reasonableness, the determined said third validity of the calibrated received pressure altitude signal, the received aircraft altitude signal and the calibrated pressure altitude signal.

18. The method of claim 8, wherein c. calculating an error signal for the received pressure altitude signal comprises:
   (i). receiving an aircraft position signal;
   (ii). determining nearest runway based on received aircraft position signal and a predefined database of runways;
   (iii). determining distance to and height above the determined nearest runway based received aircraft position signal and received aircraft altitude signal; and
   (iv). calculating the error signal for the received pressure altitude signal based on the received pressure altitude signal, a predefined altimeter error factor and the determined distance to and height above nearest runway.

19. The method of claim 18, wherein c.(iv). calculating an error signal for the received pressure altitude signal based on the received pressure altitude signal, a predefined altimeter error factor and the determined distance to and height above nearest runway, further comprises:
   A. predicting current instability of the atmosphere; and
   B. calculating the error signal for the received pressure altitude signal based on the predicted the current instability of the atmosphere.

20. The method of claim 18, wherein the received aircraft altitude and position signals are generated by a satellite navigation system.

21. The method of claim 17, wherein h. generating a modified aircraft altitude signal further comprises:
   (i). if the received pressure altitude signal was determined reasonable and the calibrated received pressure altitude signal was determined unreasonable, outputting the received pressure altitude signal as the modified aircraft altitude signal, the calculated error signal for the received pressure altitude signal and the received said first validity signal of the received pressure altitude signal;
   (ii). if the received pressure altitude signal and the calibrated received pressure altitude signal were determined reasonable, generating a modified aircraft altitude signal based on the received pressure altitude signal and the calibrated pressure altitude signal; and
   (iii). if the received pressure altitude signal was determined unreasonable and if said second validity signal of the received aircraft altitude signal indicates valid, outputting the aircraft altitude signal with corresponding error signal.

22. The method of claim 21, wherein h.(ii). generating a modified aircraft altitude signal based on the received pressure altitude signal and the received aircraft altitude signal comprises:
   A. determining the lowest value of the calculated error signal for the received pressure altitude signal and the calculated an error signal for the calibrated received pressure altitude signal; and
   B. selecting the received pressure altitude signal or the received aircraft altitude signal with the determined lowest value as the modified aircraft altitude signal.

23. The method of claim 21, wherein h.(ii). generating a modified aircraft altitude signal based on the received pressure altitude signal and the received aircraft altitude signal comprises averaging the received pressure altitude signal and the received aircraft altitude signal.

24. The method of claim 21, wherein h.(ii). generating a modified aircraft altitude signal based on the received pressure altitude signal and the received aircraft altitude signal comprises:
   A. generating a weighted value for the received pressure altitude signal and the calibrated received pressure altitude signal based on the calculated error signal for the received pressure altitude signal and the calculated error signal for the calibrated received pressure altitude signal, respectively; and
   B. combining the received pressure altitude signal and the calibrated received pressure altitude signal based on the generated weighted values.

25. An apparatus for determining a modified aircraft altitude signal, said apparatus comprising:
   a. a receiving component for receiving pressure altitude signal, a first validity signal of the received pressure altitude signal, an aircraft altitude signal, and at least one error signal and a second validity signal associated with the aircraft altitude signal;
   b. an initializer for initializing the pressure altitude signal;
   c. a pressure altitude error calculator for calculating an error signal for the pressure altitude signal based on the initialization of the pressure altitude signal;
   d. a complementary filter for calibrating the received pressure altitude signal based on the received aircraft altitude signal, the at least one error signal associated with the aircraft altitude signal and the calculated error signal for the pressure altitude signal;
   e. a calibrated pressure altitude calculator for calculating an error signal for the calibrated pressure altitude signal;
   f. a validity determiner for determining a third validity of the calibrated received pressure altitude signal based on said first received validity signal of the received pressure altitude signal and said second received validity signal of the received aircraft altitude signal;
   g. a reasonable determiner for determining reasonableness of the received pressure altitude signal and the calibrated received pressure altitude signal; and
   h. an aircraft altitude generator for generating a modified aircraft altitude signal based on the determined reasonableness, the determined said third validity of the calibrated received pressure altitude signal, the received aircraft altitude signal and the calibrated pressure altitude signal.

26. The apparatus of claim 25, wherein the aircraft altitude generator further comprises:
   (i). a first component for outputting the received pressure altitude signal as the modified aircraft altitude signal, the calculated error signal for the received pressure altitude signal and the received said first validity signal of the received pressure altitude signal, if the received pressure altitude signal was determined reasonable and the calibrated received pressure altitude signal was determined unreasonable;
   (ii). a second component for generating a modified aircraft altitude signal based on the received pressure altitude signal and the calibrated pressure altitude signal, if the received pressure altitude signal and the calibrated received pressure altitude signal were determined reasonable,; and
   (iii). a third component for outputting the aircraft altitude signal with error signal, if the received pressure altitude signal was determined unreasonable and if said second validity signal of the received aircraft altitude signal indicates valid.

27. The apparatus of claim 26, wherein the second component comprises:
   A. a first subcomponent for determining the lowest value of the calculated error signal for the received pressure altitude signal and the calculated an error signal for the calibrated received pressure altitude signal; and
   B. a second subcomponent for selecting the received pressure altitude signal or the received aircraft altitude signal with the determined lowest value as the modified aircraft altitude signal.

28. The apparatus of claim 26, wherein the second component comprises an averaging component for averaging the received pressure altitude signal and the received aircraft altitude signal.

29. The apparatus of claim 26, wherein the second component comprises:
   A. a weight generator for generating a weighted value for the received pressure altitude signal and the calibrated received pressure altitude signal based on the calculated error signal for the received pressure altitude signal and the calculated error signal for the calibrated received pressure altitude signal, respectively; and
   B. a combiner for combining the received pressure altitude signal and the calibrated received pressure altitude signal based on the generated weighted values.

30. The apparatus of claim 25, wherein the pressure altitude error calculator comprises:
   (i). a second receiving component for receiving an aircraft position signal;
   (ii). a runway determiner for determining nearest runway based on received aircraft position signal and a predefined database of runways;
   (iii). a proximity determiner for determining distance to and height above the determined nearest runway based received aircraft position signal and received aircraft altitude signal; and
   (iv). an error calculator for calculating the error signal for the received pressure altitude signal based on the received pressure altitude signal, a predefined altimeter error factor and the determined distance to and height above nearest runway.

31. The apparatus of claim 30, wherein the error calculator further comprises:
   A. a predicting component for predicting current instability of the atmosphere; and
   B. a subcomponent for calculating the error signal for the received pressure altitude signal based on the predicted the current instability of the atmosphere.

32. The apparatus of claim 30, wherein the received aircraft altitude and position signals are generated by a satellite navigation system.

33. A method for determining a modified aircraft altitude signal, said method comprising:
   a. receiving an air temperature signal, a pressure altitude signal, a first validity signal associated with the pressure altitude signal, aircraft altitude and position signals, and at least one error signal and a second validity signal associated with the aircraft altitude and position signals;
   b. generating a hydrostatic altitude signal based on the received pressure altitude signal and the air temperature signal;
   c. initializing the hydrostatic altitude signal;
   d. calculating an error signal for the received hydrostatic altitude signal based the initialization of the hydrostatic altitude signal;
   e. calibrating the hydrostatic altitude signal based on the received aircraft altitude signal, the at least one error signal associated with the aircraft altitude signal and the calculated error signal for the hydrostatic altitude signal;
   f. calculating an error signal for the calibrated hydrostatic altitude signal based on the most recent calibration of the hydrostatic altitude signal;
   g. determining a third validity of the calibrated hydrostatic altitude signal based on the received said first validity signal of the received pressure altitude signal and the said second validity signal associated with the received aircraft altitude signal;
   h. determining reasonableness of the generated hydrostatic altitude signal and the calibrated hydrostatic altitude signal; and
   i. generating a modified aircraft altitude signal based on the determined reasonableness, the determined said third validity of the calibrated hydrostatic altitude signal, the received aircraft altitude signal, and the calibrated hydrostatic altitude signal.

34. The method of claim 33, wherein f. calculating an error signal for the calibrated hydrostatic altitude signal comprises:
   (i) determining the difference between the last received error signal associated with the last received aircraft altitude and position signals and the most recently received error signal associated with the most recently received aircraft altitude and position signals;
   (ii) if the determined difference is below a predefined threshold, the calculation of the error signal for the calibrated hydrostatic altitude signal is based on predefined error values, changes in time, distance and altitude since the last calibration with a determined difference below the predefined threshold, and the error signal associated with the received aircraft altitude and position signals; and
   (iii) if the determined difference is above a predefined threshold, calculating the error signal for the calibrated hydrostatic altitude signal is based on the predefined error values, on changes in time, distance and altitude since the last calibration with a determined difference below the predefined threshold and the error signal associated with the aircraft altitude and position signals received at the last calibration with a determined difference below the predefined threshold.

35. The method of claim 33, further comprising replacing the generated hydrostatic altitude signal with the received pressure altitude signal, if the air temperature signal becomes lost or invalid.

36. The method of claim 35, wherein d. calculating an error signal for the received hydrostatic altitude signal performs calculating an error signal for the pressure altitude and comprises:
   (i). determining nearest runway based on the received aircraft position signal and a predefined database of runway elevations;
   (ii). determining distance to and height above the determined nearest runway based received aircraft position signal and received aircraft altitude signal; and
   (iv). calculating the error signal for the received pressure altitude signal based on the received pressure altitude signal, a predefined altimeter error factor and the determined distance to and height above the nearest runway.

37. The method of claim 33, wherein c. initializing the hydrostatic altitude signal is performed on the ground prior to takeoff or is performed in flight, if a power up is required in flight.

38. The method of claim 37, wherein d. calculating an error signal for the hydrostatic altitude signal is based on predefined error values and changes in time, distance and altitude since most recent initialization.

39. The method of claim 38, wherein d. calculating an error signal for the hydrostatic altitude signal is further based on a predefined value, if the most recent initialization was performed on the ground prior to takeoff; or based on the error signal associated with the received aircraft altitude and position signals, if the most recent initialization was performed in flight.

40. The method of claim 33, wherein i. generating a modified aircraft altitude signal further comprises:
  (i). if the generated hydrostatic altitude signal was determined reasonable and the calibrated hydrostatic altitude signal was determined unreasonable, outputting the calculated hydrostatic altitude signal error and the generated hydrostatic altitude signal as the modified aircraft altitude signal;
  (ii). if the generated hydrostatic altitude signal and the calibrated hydrostatic altitude signal were determined reasonable, generating a modified aircraft altitude signal based on the generated hydrostatic altitude signal, the calibrated hydrostatic altitude signal and the received aircraft altitude signal; and
  (iii). if the generated hydrostatic altitude signal was determined unreasonable and if said second validity signal of the received aircraft altitude signal indicates valid, outputting the aircraft altitude signal with error signal.

41. The method of claim 40, wherein i.(ii). generating a modified aircraft altitude signal based on the generated hydrostatic altitude signal, the calibrated hydrostatic altitude signal and the received aircraft altitude signal comprises averaging the generated hydrostatic altitude signal and the generated calibrated hydrostatic altitude signal.

42. The method of claim 40, wherein i.(ii). generating a modified aircraft altitude signal based on the generated hydrostatic altitude signal, the calibrated hydrostatic altitude signal and the received aircraft altitude signal comprises:
  (i). generating weighted values for the generated hydrostatic altitude signal and the calibrated hydrostatic altitude signal based on the calculated error signal for the generated hydrostatic altitude signal and the calculated error signal for the calibrated hydrostatic altitude signal, respectively; and
  (ii). combining the generated hydrostatic altitude signal and the calibrated hydrostatic altitude signal based on the generated weighted values.

43. The method of claim 40, wherein i.(ii). generating a modified aircraft altitude signal based on the generated hydrostatic altitude signal, the calibrated hydrostatic altitude signal and the received aircraft altitude signal comprises:
  (i). determining the lowest value of the calculated error signal for the received hydrostatic altitude signal and the calculated an error signal for the calibrated received hydrostatic altitude signal; and
  (ii). selecting the received hydrostatic altitude signal or the received aircraft altitude signal with the determined lowest value.

44. The method of claim 40, further comprising:
  j. receiving a radio altimeter generated altitude signal and a fourth validity signal associated with the radio altimeter altitude signal;
  k. if the aircraft is below a predefined altitude, calibrating the hydrostatic altitude signal based on the received radio altimeter generated altitude signal and a predefined terrain elevation database;
  l. calculating an error signal for the radio altimeter calibrated hydrostatic altitude signal based on the most recent radio altimeter calibration of the hydrostatic altitude signal;
  m. determining a fifth validity of the radio altimeter calibrated hydrostatic altitude signal based on said first received validity signal of the received pressure altitude signal and said fourth validity signal associated with the received radio altimeter altitude signal; and
  n. determining reasonableness of the radio altimeter calibrated hydrostatic altitude signal;
wherein generating a modified aircraft altitude signal is further based on the radio altimeter calibrated hydrostatic altitude signal, the determined reasonableness of the radio altimeter calibrated hydrostatic altitude signal and the calculated error signal for the radio altimeter calibrated hydrostatic altitude signal.

45. The method of claim 44, further comprising calculating an accuracy value for the predefined terrain elevation database based on a predefined database cell size and the received aircraft position signal.

46. The method of claim 45, wherein l. calculating an error signal for the radio altimeter calibrated hydrostatic altitude signal is based on predefined error values, changes in time, distance and altitude since most recent radio altimeter calibration of the hydrostatic altitude signal, predefined radio altimeter accuracy values and the estimated accuracy of the predefined terrain elevation database.

47. An apparatus for determining a modified aircraft altitude signal, said apparatus comprising:
  a. a receiving component for receiving an air temperature signal, a pressure altitude signal, a first validity signal associated with the pressure altitude signal, aircraft altitude and position signals, and at least one error signal and a second validity signal associated with the aircraft altitude and position signals;
  b. a hydrostatic altitude generator for generating a hydrostatic altitude signal based on the received pressure altitude signal and the air temperature signal;
  c. an intializer for initializing the generated hydrostatic altitude signal;
  d. an hydrostatic altitude calculator for calculating an error signal for the received hydrostatic altitude signal based the initialization of the hydrostatic altitude signal;
  e. a complementary filter for calibrating the hydrostatic altitude signal based on the received aircraft altitude signal, the at least one error signal associated with the aircraft altitude signal and the calculated error signal for the generated hydrostatic altitude signal;
  f. a calibrated hydrostatic altitude calculator for calculating an error signal for the calibrated hydrostatic altitude signal based on the most recent calibration of the hydrostatic altitude signal;
  g. a validity determiner for determining a third validity of the calibrated hydrostatic altitude signal based on said first received validity signal of the received pressure altitude signal and said second validity signal associated with the received aircraft altitude signal;

h. a reasonable determiner for determining reasonableness of the generated hydrostatic altitude signal and the calibrated hydrostatic altitude signal; and i. an aircraft altitude generator for generating the modified aircraft altitude signal based on the determined reasonableness, the determined said third validity of the calibrated hydrostatic altitude signal, the received aircraft altitude signal, and the calibrated hydrostatic altitude signal.

48. A computer program product for performing the method of claim 47.

49. The apparatus of claim 47, wherein the calibrated hydrostatic altitude calculator comprises:

(i) a difference determiner for determining the difference between the last received error signal associated with the last received aircraft altitude and position signals and the most recently received error signal associated with the most recently received aircraft altitude and position signals;

(ii) if the determined difference is below a predefined threshold, the calibrated hydrostatic altitude calculator performs the calculation of the error signal for the calibrated hydrostatic altitude signal based on predefined error values, changes in time, distance and altitude since the last calibration with a determined difference below the predefined threshold, and the error signal associated with the received aircraft altitude and position signals; and (iii) if the determined difference is above a predefined threshold, the calibrated hydrostatic altitude calculator performs the calculation of the error signal for the calibrated hydrostatic altitude signal based on the predefined error values, on changes in time, distance and altitude since the last calibration with a determined difference below the predefined threshold and the error signal associated with the aircraft altitude and position signals received at the last calibration with a determined difference below the predefined threshold.

50. A computer program product for performing the method of claim 49.

51. The apparatus of claim 47, further comprising a default component for replacing the generated hydrostatic altitude signal with the received pressure altitude signal, if the air temperature signal becomes lost or invalid.

52. A computer program product for performing the method of claim 51.

53. The apparatus of claim 51, wherein the hydrostatic altitude calculator comprises:

(i). a runway determiner for determining nearest runway based on the received aircraft position signal and a predefined database of runway elevations;

(ii). a runway proximity determiner for determining distance to and height above the determined nearest runway based received aircraft position signal and received aircraft altitude signal; and (iv). an error calculator for calculating the error signal for the received pressure altitude signal based on the received pressure altitude signal, a predefined altimeter error factor and the determined distance to and height above the nearest runway.

54. A computer program product for performing the method of claim 53.

55. The apparatus of claim 47, wherein the initializer performs the initialization on the ground prior to takeoff or in flight, if the apparatus requires a power up in flight.

56. A computer program product for performing the method of claim 55.

57. The apparatus of claim 55, wherein the calculation performed by the hydrostatic altitude calculator is based on predefined error values and changes in time, distance and altitude since most recent initialization.

58. A computer program product for performing the method of claim 57.

59. The apparatus of claim 57, wherein the calculation performed by the hydrostatic altitude calculator is further based on a predefined value, if the most recent initialization was performed on the ground prior to takeoff; or based on the error signal associated with the received aircraft altitude and position signals, if the most recent initialization was performed in flight.

60. A computer program product for performing the method of claim 59.

61. The apparatus of claim 47, wherein the aircraft altitude generator comprises:

(i). a first component for outputting the calculated hydrostatic altitude signal error and the generated hydrostatic altitude signal as the modified aircraft altitude signal, if the generated hydrostatic altitude signal was determined reasonable and the calibrated hydrostatic altitude signal was determined unreasonable;

(ii). a second component for generating the modified aircraft altitude signal based on the generated hydrostatic altitude signal, the calibrated hydrostatic altitude signal and the received aircraft altitude signal, if the generated hydrostatic altitude signal and the calibrated hydrostatic altitude signal were determined reasonable; and (iii). a third component for outputting the aircraft altitude signal with error signal, if the generated hydrostatic altitude signal was determined unreasonable and if said second validity signal of the received aircraft altitude signal indicates valid.

62. The apparatus of claim 61, wherein the second component comprises:

(i). a weight generator for generating weighted values for the generated hydrostatic altitude signal and the calibrated hydrostatic altitude signal based on the calculated error signal for the generated hydrostatic altitude signal and the calculated error signal for the calibrated hydrostatic altitude signal, respectively; and (ii). a combiner for combining the generated hydrostatic altitude signal and the calibrated hydrostatic altitude signal based on the generated weighted values.

63. A computer program product for performing the method of claim 62.

64. The apparatus of claim 61, wherein the second component comprises an averaging component for averaging the generated hydrostatic altitude signal and the generated calibrated hydrostatic altitude signal.

65. A computer program product for performing the method of claim 64.

66. A computer program product for performing the method of claim 61.

67. The apparatus of claim 61, wherein the second component comprises:

(i). a first subcomponent for determining the lowest value of the calculated error signal for the received hydrostatic altitude signal and the calculated an error signal for the calibrated received hydrostatic altitude signal; and (ii). a second subcomponent for selecting the received hydrostatic altitude signal or the received aircraft altitude signal with the determined lowest value.

68. A computer program product for performing the method of claim 67.

69. The apparatus of claim 61, further comprising:
j. a second receiving component for receiving a radio altimeter generated altitude signal and a fourth validity signal associated with the radio altimeter altitude signal;
k. if the aircraft is below a predefined altitude, a radio altimeter calibrator for calibrating the hydrostatic altitude signal based on the received radio altimeter generated altitude signal and a predefined terrain elevation database;
l. a radio altimeter error calculator for calculating an error signal for the radio altimeter calibrated hydrostatic altitude signal based on the most recent radio altimeter calibration of the hydrostatic altitude signal;
m. a radio altimeter validity determiner for determining a fifth validity of the radio altimeter calibrated hydrostatic altitude signal based on said first received validity signal of the received pressure altitude signal and said fourth validity signal associated with the received radio altimeter altitude signal; and
n. a radio altimeter reasonable determiner for determining reasonableness of the radio altimeter calibrated hydrostatic altitude signal;

wherein the aircraft altitude generator performs generating the modified aircraft altitude signal further based on the determined reasonableness of the radio altimeter calibrated hydrostatic altitude signal and the radio altimeter calibrated hydrostatic altitude signal.

70. A computer program product for performing the method of claim 69.

71. The apparatus of claim 69, further comprising an accuracy calculator for calculating an accuracy value for the predefined terrain elevation database based on a predefined database cell size and the received aircraft position signal.

72. A computer program product for performing the method of claim 71.

73. The apparatus of claim 71, wherein the radio altimeter error calculator performs calculating an error signal for the radio altimeter calibrated hydrostatic altitude signal based on predefined error values, changes in time, distance and altitude since most recent radio altimeter calibration of the hydrostatic altitude signal, predefined radio altimeter accuracy values and the estimated accuracy of the predefined terrain elevation database.

74. A computer program product for performing the method of claim 73.

* * * * *